(12) United States Patent
Sharon et al.

(10) Patent No.: US 6,704,543 B1
(45) Date of Patent: Mar. 9, 2004

(54) MULTI-BEAM SATELLITE COMMUNICATIONS SYSTEM

(75) Inventors: Thomas E. Sharon, Duluth, GA (US); Thomas S. Taylor, Atlanta, GA (US); William R. Hafner, Alpharetta, GA (US); Steven H. Rigg, Norcross, GA (US); James M. Howell, Woodstock, GA (US)

(73) Assignee: EMS Technologies, Inc., Norcross, GA (US)

( * ) Notice: Subject to any disclaimer, the term of this patent is extended or adjusted under 35 U.S.C. 154(b) by 0 days.

(21) Appl. No.: 09/576,475

(22) Filed: May 23, 2000

Related U.S. Application Data

(60) Provisional application No. 60/156,170, filed on Sep. 27, 1999.

(51) Int. Cl.[7] .................... H04B 7/185; H04Q 7/20
(52) U.S. Cl. ................ 455/12.1; 455/13.1; 455/427; 455/429
(58) Field of Search ................ 455/12.1, 13.1, 455/13.2, 13.3, 427–436, 440, 445, 456, 422, 13.4, 553, 560; 370/357, 352, 353, 354

(56) References Cited

U.S. PATENT DOCUMENTS

| | | | |
|---|---|---|---|
| 3,810,255 A | 5/1974 | Wachs et al. | |
| 4,228,401 A | 10/1980 | Wachs et al. | |
| 4,689,625 A | 8/1987 | Barmat | |
| 4,706,239 A | 11/1987 | Ito et al. | |
| 4,813,036 A | 3/1989 | Whitehead | |
| 4,858,225 A | 8/1989 | deSantis | |

(List continued on next page.)

FOREIGN PATENT DOCUMENTS

| | | |
|---|---|---|
| EP | 0 536 628 A1 | 4/1993 |
| EP | 0 748 064 A2 | 12/1996 |
| EP | 0 883 252 A2 | 12/1998 |
| EP | 0 967 745 A2 | 12/1999 |

OTHER PUBLICATIONS

Horst D. Clausen, Bernhard Nocker, "Internet Services via Direct Broadcast Satellites", Feb. 5, 1997, pp. 468–475.

Martin et al., "Broadband Wireless Services from High Altitude Long Operation (HALO™) Aircraft," Proceedings of the SPIE, U.S., SPIE, Bellingham, VA, vol. 3232, Nov. 5, 1997, pp. 9–20, No. XP002093950.

(List continued on next page.)

Primary Examiner—Nay Maung
Assistant Examiner—Edan Orgad
(74) Attorney, Agent, or Firm—King & Spalding LLP

(57) ABSTRACT

A satellite communications system having ground user terminals, hubs, and a geosynchronous satellite. The satellite generates a network of spot beam coverage areas on the earth. A hub and at least one ground terminal are located in each of at least two spot beams. A first user terminal transmits an uplink signal according to a first signal protocol to the hub through the satellite. A second user terminal receives a downlink signal according to a second signal protocol through the downlink spot beam from the hub through the satellite. The hub may be located in the same spot beam coverage area as the first or the second user terminal or may be located in an altogether different spot beam coverage area. Through selective frequency and/or polarization routing on board the satellite, a hub located within a "parent" beam can communicate with user terminals within the parent beam at a specified frequency and polarization, and can communicate with users in other "dependent" beams on a different frequency and/or polarization. This routing allocates the total available bandwidth between parent and dependent beams. The system enables asynchronous communications between each hub and the satellite to maximize frequency re-use and the overall capacity of the system.

5 Claims, 20 Drawing Sheets

U.S. PATENT DOCUMENTS

| | | | |
|---|---|---|---|
| 4,903,126 A | | 2/1990 | Kassatly ................... 358/146 |
| 4,931,802 A | | 6/1990 | Assal et al. ................ 342/356 |
| 5,119,225 A | | 6/1992 | Grant et al. ................ 359/172 |
| 5,394,560 A | * | 2/1995 | Kane ........................ 455/12.1 |
| 5,412,660 A | * | 5/1995 | Chen et al. ................ 370/318 |
| 5,424,862 A | | 6/1995 | Glynn |
| 5,428,814 A | | 6/1995 | Mort et al. ................ 455/12.1 |
| 5,552,920 A | | 9/1996 | Glynn ........................ 359/172 |
| 5,594,780 A | * | 1/1997 | Wiedeman et al. ........ 455/430 |
| 5,640,386 A | * | 6/1997 | Wiedeman .................. 370/320 |
| 5,680,240 A | | 10/1997 | Glynn |
| 5,697,050 A | * | 12/1997 | Wiedeman ................ 455/12.1 |
| 5,809,141 A | * | 9/1998 | Dent et al. ................. 380/247 |
| 5,822,312 A | | 10/1998 | Peach et al. |
| 5,864,546 A | | 1/1999 | Campanella ............... 370/316 |
| 5,884,142 A | * | 3/1999 | Wiedeman et al. ........ 455/12.1 |
| 5,898,681 A | * | 4/1999 | Dutta ........................ 370/229 |
| 5,963,862 A | * | 10/1999 | Adiwoso et al. ............ 455/430 |
| 6,240,124 B1 | * | 5/2001 | Wiedeman et al. ......... 375/130 |
| 6,256,496 B1 | * | 7/2001 | Dintelmann et al. ........ 455/427 |
| 6,278,876 B1 | * | 8/2001 | Joshi et al. ................. 455/427 |
| 6,415,329 B1 | * | 7/2002 | Gelman et al. ............. 709/245 |
| 6,496,682 B2 | * | 12/2002 | Butte et al. ................ 455/12.1 |
| 2003/0109220 A1 | * | 6/2003 | Hadinger et al. .......... 455/13.1 |

OTHER PUBLICATIONS

Garg et al., "Cost Effective Personal Communications Using Geo–Synchronous Satellite," IEEE International Conference on Personal Wireless Communications Proceedings, 1996, pp. 289–293, No. XP002082547.

International Search Report in related PCT Application No. PCT/US00/25878, mailed Apr. 20, 2001.

"Microstar® Plus Millimeter Wave Radio; 38 GHz North American Digital Hierarchy," Harris Corporation, Quebec, Canada, Jul. 1996.

"High Definition Desktop", *Business 2.0*, Jan. 2000.

"Geocast: About Us" and "Geocast: FAQ", Geocast Network Systems, Inc., http://www.geocast.com/about/index.html.

Elbert, Bruce R., "Introduction to Satellite Communication", $2^{nd}$ Edition, Norwood, MA, 1999, pp. 77–120.

* cited by examiner

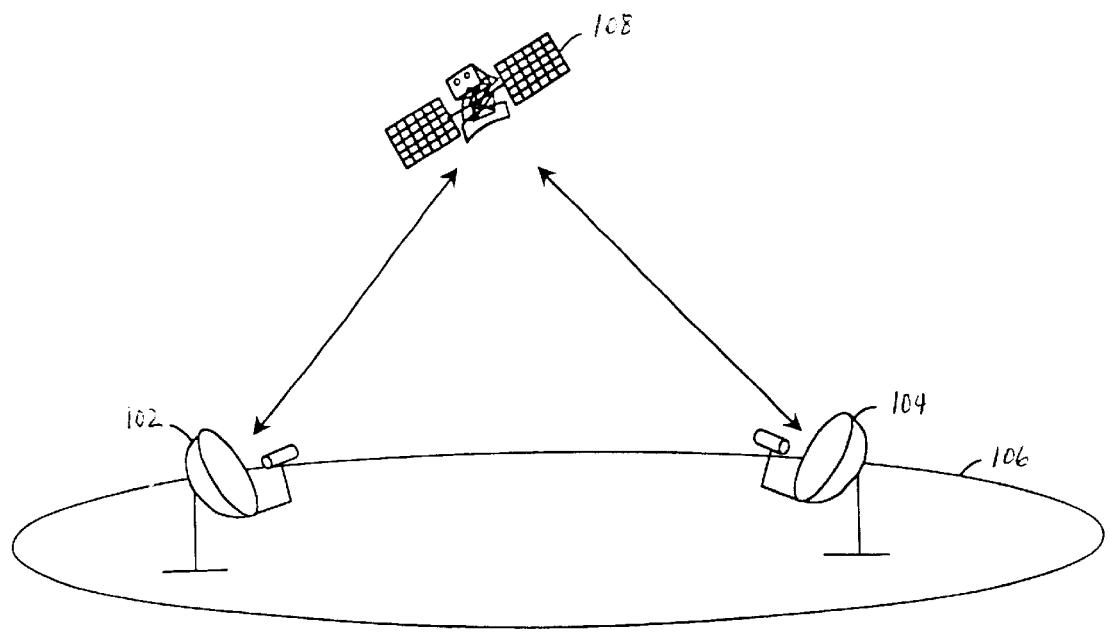
PRIOR ART  FIG. 1
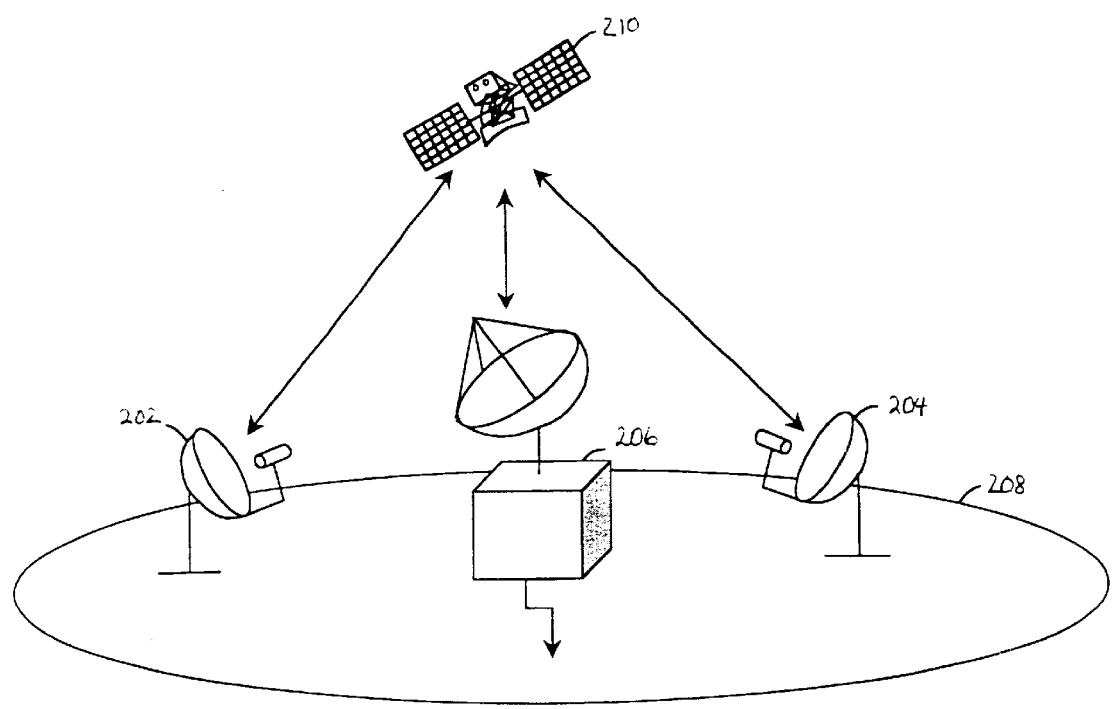
PRIOR ART  FIG. 2

MULTI-BEAM SATELLITE COMMUNICATIONS SYSTEM

RELATED APPLICATION

This application claims priority to U.S. Provisional Patent Application Serial No. 60/156,170 filed on Sep. 27, 1999.

TECHNICAL FIELD

This invention relates to satellite communications systems using multiple spot beams from a geosynchronous earth orbit satellite to provide selective coverage of the continental United States and, more particularly, relates to a system having a satellite receiving hub in every spot beam that allows for asynchronous communications between each hub and the satellite for maximizing frequency re-use.

BACKGROUND OF THE INVENTION

The rapid growth of the Internet and the unavailability of high-speed connections from standard telephone lines and local cable providers have resulted in an intense search for an alternative high-speed mode of communications. Satellite communications ("SATCOM") systems are a natural selection for replacing conventional land-based communications systems as a means of providing high-speed digital communications new links.

Typical SATCOM system configurations are shown in FIGS. 1–3. FIG. 1 is an illustration of a SATCOM "bent-pipe" configuration for two ground terminals located within the same beam. In the bent-pipe configuration, a first ground terminal 102 transmits a signal on the uplink frequency band to a GEO satellite 108. Upon reception of the signal, the GEO satellite shifts the frequency of the signal to a downlink frequency and retransmits the signal to the second ground terminal 104. The "bent-pipe" configuration does not require the satellite to have on-board processing. Rather, the satellite merely acts as a relay from one ground terminal to another ground terminal. Because the satellite does not have on-board processing, the "bent-pipe" configuration is typically limited to use within a single beam 106.

Another standard SATCOM configuration is shown in FIG. 2, which illustrates a SATCOM "hub" configuration. In the "hub" configuration, a series of ground terminals 202, 204 and a single hub 206 are located within a single beam 208. The hub acts as a two-step bent-pipe configuration, in which the uplink signal is routed from the GEO satellite 210 to an intermediate ground hub 206. The hub acts as a local control center to assign channels and other functions associated with the network management. The intermediate stop typically adds an additional ¼-second to the signal propagation delay normally associated with the round-trip to a GEO satellite, which is unacceptable for high-quality telephony services. In order to avoid this additional delay, the hub configuration can also operate as a "bent-pipe" configuration, in which the hub is bypassed and the downlink signal is routed directly to a second ground terminal.

Additionally, ground terminals within the hub configuration may also operate in a one-way "broadcast" mode, in which a single ground terminal transmits an uplink signal to the GEO satellite, which shifts the frequency for transmission on the downlink channel. However, instead of simply transmitting the downlink signal to a single ground terminal, the satellite "broadcasts" the signal over the downlink channel to every ground terminal within the beam.

Still another standard SATCOM configuration is shown in FIG. 3, which is an illustration of the SES ARCS SATCOM system. The ARCS SATCOM system combines DVB technology on the downlink signal with a high-speed satellite uplink signal. The ARCS SATCOM system uses a standard Ku-Band DVB downlink 314 and a "piggyback" Ka-band payload, which routes Ka-band uplinks 316 from individual ground terminals 304 to a single hub 306, located in Luxembourg. The ARCS SATCOM system provides eight beams 302 on the Ka-band uplink, each of which has a footprint of approximately 500 miles diameter on the earth. As a result of this high gain from the receive antenna on the satellite 308, a dish only 75 cm in diameter with a ½W transmitter can provide 144 Kbps return channel data rate. The Ka-band uplinks from all eight of the beams are returned to the single hub in Luxembourg for processing. The DVB video data for the Ku band is broadcast on an uplink signal 312 to the satellite from the hub 306, and is re-broadcast on the downlink signal using Ku-band DVB transponders.

Conventional SATCOM systems using geosynchronous earth orbits ("GEO") satellites have typically provided two types of services: (a) a relay mode, in which the GEO satellite merely relays a signal from one earth terminal to another, and (b) a broadcast mode, in which the GEO satellite transmits a signal to a large number of ground terminals. In the relay mode, also known as a "bent-pipe" mode, a ground terminal transmits a signal using an uplink frequency to the GEO satellite, which retransmits the signal to a second ground terminal using a downlink frequency. This mode is illustrated in FIG. 1. Because the transmission footprint of the GEO satellite on the earth surface is large, the power density of the signal is very low. This requires that the receiving antenna be sufficiently large, ranging from one to three meters in diameter, to achieve the requisite antenna gain. However, these large antennas are practical only for large, commercial users. Individual consumers cannot afford the space or expense of these large ground antennas. Individual consumers are willing to tolerate only small antennas, such as those used for direct broadcast satellite (DBS) transmissions, which are typically one to two feet in diameter.

Small ground antennas often operate with a "hub" service, in which the user uplink is routed from the satellite to an intermediate ground station known as the "hub." This service is illustrated in FIG. 2. The hub usually acts a local control center to assign channels and other functions associated with network management. This intermediate "stop" adds an additional ¼ second to the propagation delay associated with the round trip to synchronous orbit, so the total delay in one terminal transmitting to another is approximately ½ second—a delay many consider too long for viable high quality telephony today. The GEO satellite can also operate in a "mesh" configuration in which the user downlink is routed directly to the other user without the hub transmission.

In the broadcast mode, a hub or "feeder link" sends the entire spectrum of broadcast signals to the GEO satellite, which then rebroadcasts the signals to the region of interest. It is important to note that in the broadcast service all users receive the same signals, which are typically transmitted at nearly equal power levels because the ground terminals are assumed to receive the entire band of signals everywhere. The broadcast spectrum is divided up into a number of transponder bandwidths, each of which can carry a multiple of standard TV channels, high definition TV, or data. This type of transmission has become especially important in the direct broadcast satellite ("DBS") of standard broadcast television as a competing service to cable.

Typically, GEO SATCOM systems use a single wide area coverage beam with a diameter of approximately 2,500 miles to provide complete coverage of CONUS. Therefore, in order for a ground antenna to receive adequate signal strength, the transmitter on the satellite must have sufficient power to provide an adequate power density within the single wide area coverage beam. However, this greatly increases the cost and complexity of the GEO satellite.

Another way to ensure that the ground terminal receives adequate signal strength is to use a ground station with a large diameter antenna to achieve the requisite gain. However, as the size of the antenna increases, so does the expense. Therefore, only commercial users are able to afford these antennas. Clearly, this solution is unacceptable to individual users, who demand cheaper, more aesthetically pleasing, smaller antennas.

Several attempts have been made to address this problem. One solution is to use a number of smaller spot beams instead of a single wide area coverage beam to cover the same geographical area. By decreasing the size of the spot beams while maintaining the same overall transmitted power, the power density within each spot beam increases. The increase in the power density within each spot beam enables the use of smaller ground antennas.

However, conventional systems employing spot beams typically only employ a single hub for the entire system. For example, in Europe, SES is preparing to deploy the ARCS system using the Astra 1H and 1K satellites to provide multi-beam coverage of Europe. The Astra 1H uses a standard Ku-Band direct video broadcast ("DVB") downlink and a "piggyback" Ka-band payload which routes individual user Ka-band uplinks to a single, central hub located in Luxembourg. The ARCS system uses eight beams on the Ka-band uplink, with each beam having a footprint of approximately 500 miles diameter on the earth to provide complete coverage of Europe. As a result of this high gain from the satellite receive antenna, a ground antenna of only 75 cm diameter with a ½W transmitter can provide a 144 Kbps return channel data rate. The Ka-band uplinks from all eight of the beams are returned to the single hub in Luxembourg. The Ku-band data for the DVB is broadcast up from a feeder link to the satellite from the Luxembourg hub and is broadcast down to the area covered by all eight spot beams through a single broadcast beam with Ku-band DVB transponders. A single-hub ARCS system employing spot beams is illustrated schematically in FIG. 3.

Other satellite systems being planned now propose to provide a bent-pipe mode between individual ground terminals in different spot beams. These satellites plan to use digital processing on board in order to route the signal from one spot beam to another, which greatly increases the cost of the system.

Thus, there is a general need in the art for a SATCOM system using multiple spot beams to cover at least selected areas of the CONUS. There is a further need in the art for a SATCOM system which has a hub in every spot beam.

SUMMARY OF THE INVENTION

The present invention meets the above-described need by providing a SATCOM system having ground terminals, hubs, and at least one satellite stationed in a geosynchronous earth orbit (GEO) about the earth. The GEO satellite generates a network of spot beams covering selected area(s). A single hub and at least one ground terminal reside within each spot beam. A user terminal with a well-defined protocol can transmit an uplink signal to the hub through the GEO satellite. The user terminal also can receive a signal having a second well-defined protocol through the downlink spot beam from the hub through the GEO satellite. For example, the uplink from the ground terminal might use a MF/TDMA multiple access method to maximize the number of users who can be "on-line" at given time. The corresponding downlink signal might may use the standard "DVB-S" protocol, which supports both video and data transmissions.

The invention may also support a mode of operation where several individual spot beams shall share a single hub in a "parent/dependent" operational mode. Through selective frequency and/or polarization routing on board the satellite, a hub located within a "parent" beam would communicate with user terminals within the parent beam at a specified frequency and polarization and would communicate with users in other "dependent" beams on a different frequency and/or polarization. This routing would divide the total available bandwidth between these parent and dependent beams. Routing on board the satellite could be implemented to allow eventual separation between the parent and dependent beam by inclusion of a switch built into the on-board routing. This would allow full use of the available bandwidth in each beam. This method of deployment could allow a more gradual installation of hubs to restrict ground equipment costs at the beginning of service provision.

The invention may also support a second class of service, in which the hub downlink uses a second protocol that is adopted for transmission from a "commercial" ground terminal. The commercial ground terminal may use this second protocol for both the uplink and downlink signals to facilitate the transmission of data at high speed from a remote site. This type of terminal can play the role of the hub in terms of transmitting directly on the downlink to "residential" terminals in either a local spot beam mode or a broadcast mode to all spots beams simultaneously.

The invention may also include "intra-Beam" and "inter-Beam" services, in which the capacity of the system is optimized by a coordinated network operation control center ("NOCC"). The NOCC can assign uplink frequencies and polarizations to individual ground terminals based on the signal destination, for both intra-beam and inter-beam transmissions. The NOCC may also assign a frequency bandwidth compatible with a narrow-band uplink (the residential service) or a wide-band uplink (the commercial service). Protocols for the residential and commercial match the two protocols used by the hub. A portion of the uplink band is assigned to each service. The NOCC may also allocate a frequency band and polarization to designate the type of service based on whether the communications link is inter-beam or intra-beam.

The invention may also include a router for directing the signal to the appropriate spot beams for inter-beam transmission. The router may operate in one of two modes. First, the router may direct the signal to the appropriate spot beam by selection of the frequency used for the uplink. Alternatively, the router may also direct the signal to the appropriate spot beam based on the signal polarization. Additionally, the router may also be used with the broadcast mode. For the broadcast mode, the selection of a particular frequency sub-band and/or polarization routes the uplink signal to into every downlink beam. Alternatively, the sub-band and/or polarization may be routed to the NOCC for a "double-hop" rebroadcast to all downlink beams.

The invention may further provide for power control in each downlink spot beam to optimize system capacity and throughput. Additionally, due to the individual spot beams being small and covering a localized area, the local weather conditions and geographical location can be factored into to the power control for each beam. Additionally, by utilizing power control, channel allocation can be optimized to allow greater numbers of channels in spot beams that encompass heavy population centers and fewer channels in spot beams covering less densely populated areas.

The invention may also provide a high-speed wide area network to connect each hub in each spot to every other hub. The high-speed WAN may be high-speed optical fiber, conventional landline connections, satellite links, or the like.

That the invention improves over the drawbacks of prior SATCOM system employing multiple spot beams and accomplishes the advantages described above will become apparent from the following detailed description of the exemplary embodiments and the appended drawings and claims.

BRIEF DESCRIPTION OF DRAWINGS

FIG. 1 is an illustration of a prior art "bent-pipe" mode SATCOM configuration.

FIG. 2 is an illustration of a prior art "broadcast" mode SATCOM configuration.

DETAILED DESCRIPTION OF THE EXEMPLARY EMBODIMENTS

The current invention can provide a hub in every spot beam of a satellite for maximum frequency re-use and allows all signal processing to be accomplished on the ground. The notion of a hub in every spot beam is also fundamental to the notion of a high capacity, local broadcast/data service through a digital video broadcast (DVB) down-link format. Otherwise the satellite downlink cannot access sufficient uplink information bandwidth to broadcast into the multiple spot beams with unique data. Even though a direct broadcast satellite can broadcast to millions of users, the capacity for information content is only about 500 Mbps×2 (assuming 500 MHz bandwidth×2 polarizations), or 1 Gbps for the whole coverage area. The current inventive concept envisions systems with approximately 100 spot beams, each of which has ~750 MHz bandwidth for each of two polarizations, or 150 Gbps potential capacity.

The hub in every spot beam concept also allows the modulation formats between ground terminal uplink and downlink signals to be different (i.e., FDMA on the uplink and TDMA on the downlink) which previously has been accomplished only by providing on-board digital processing. However, placing a hub in every spot beam allows the satellite to operate in a simple "bent-pipe design" with no on-board processing.

The use of spatially isolated spot beams allows maximum frequency re-use, which provides increased data capacity relative to the contiguous beam approach in which the beam overlap requires a frequency assignment approach and adjacent beams use only a portion of the band (4 and 7 sub-band assignments are common). The isolated spot beam approach also allows separate power control of each downlink beam to accommodate different traffic patterns and satellite power limitations. This can also be accomplished with a TDMA switching approach between downlink beams but at the expense of increased satellite and ground terminal complexity.

Figure 3:
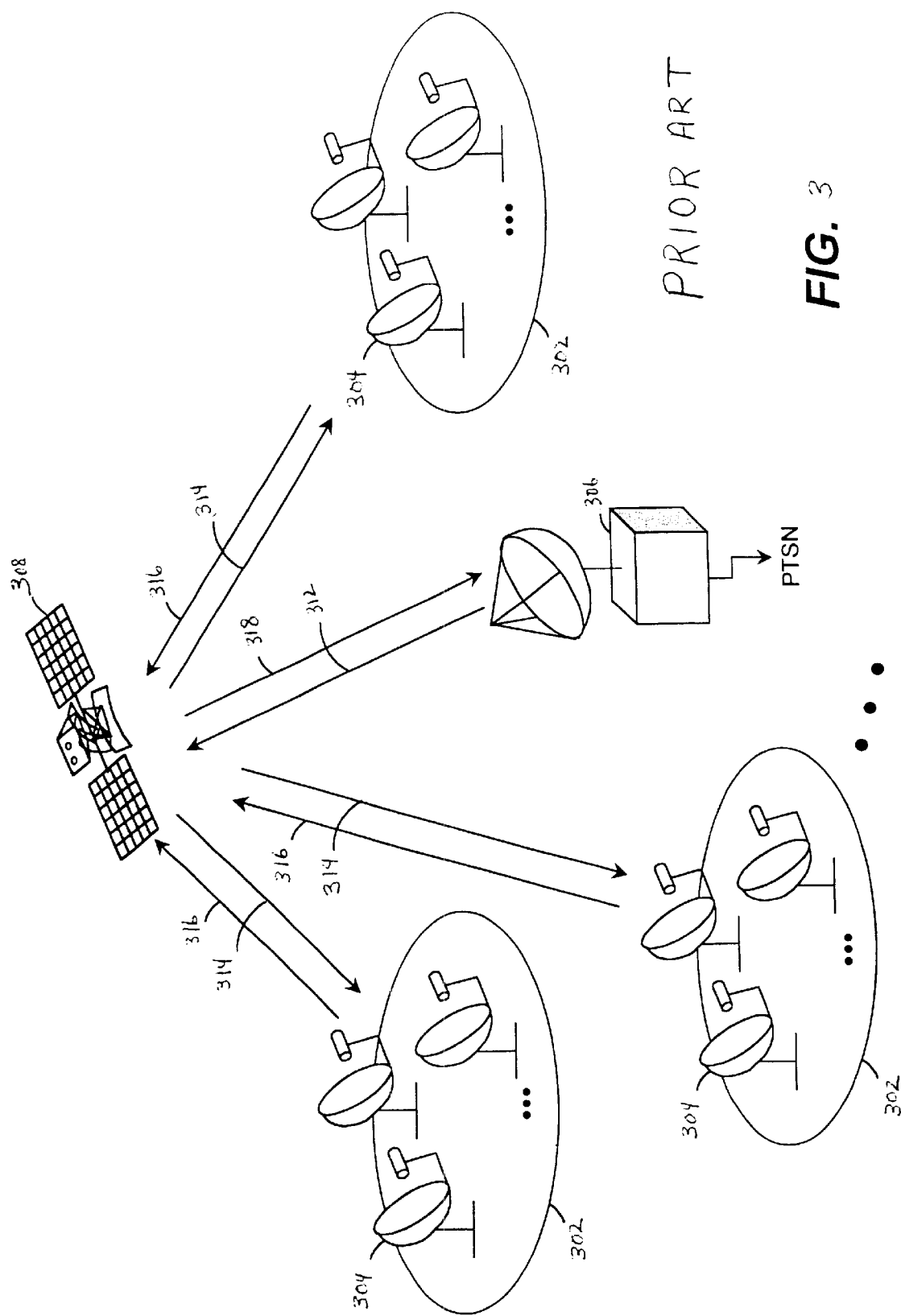
FIG. 3 is an illustration of a prior art SES ARCS SAT-COM configuration.
Figure 4:
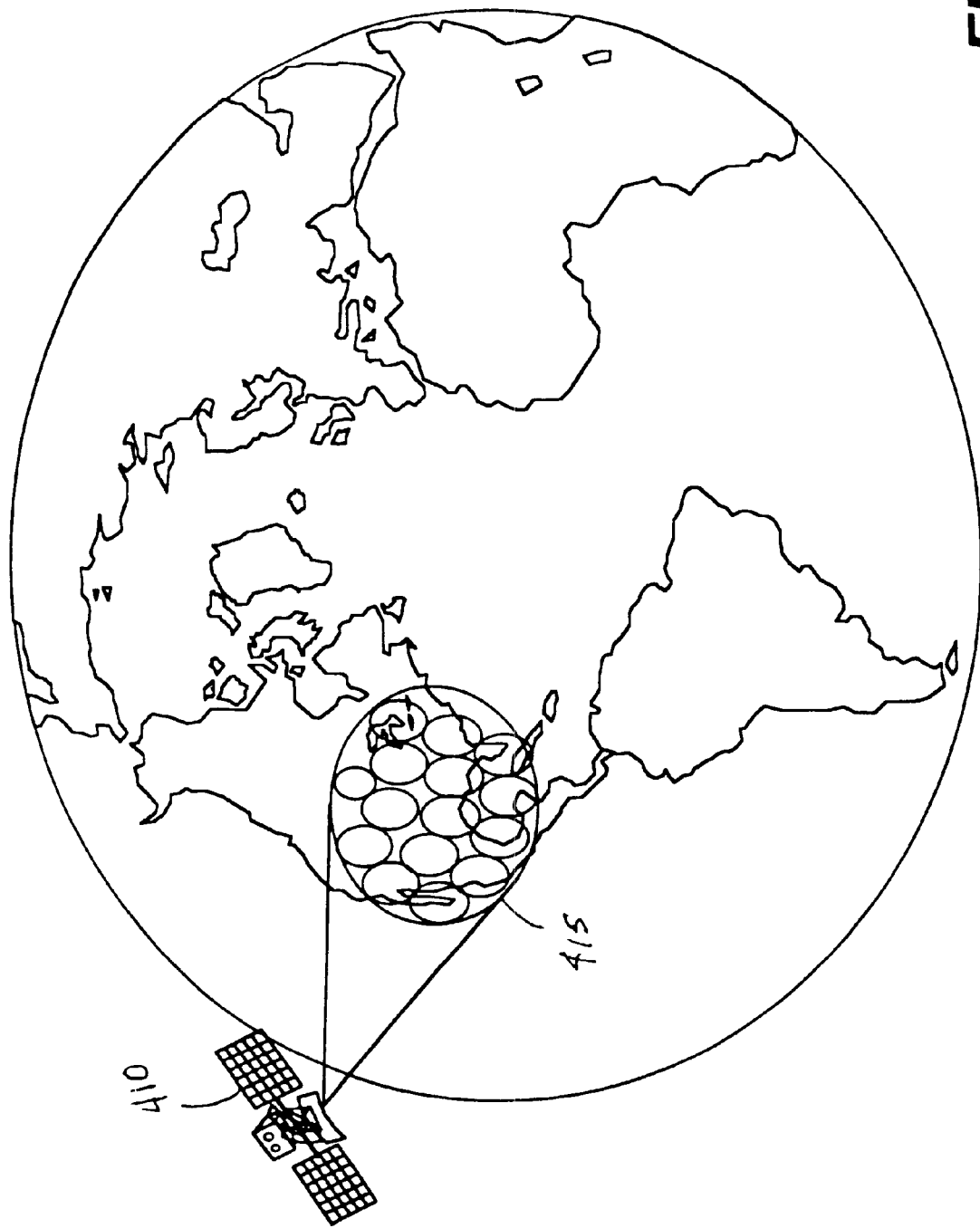
FIG. 4 is an illustration of a SATCOM system providing multiple spot beams to provide coverage of at least selected areas of the CONUS in accordance with an exemplary embodiment of the present invention.

FIG. 4 illustrates an exemplary SATCOM system using a network of spot beams to provide coverage of at least selected areas of the CONUS. A satellite 410, or a series of such satellites, stationed in a geosynchronous earth orbit above CONUS, provides the network of spot beams 415. The SATCOM system may operate at either Ku-band frequencies, Ka-band frequencies, or both to provide broadcast video, local area broadcast video and bandwidth-on-demand Internet access. The exemplary SATCOM system may use GEO satellites that produce narrow spot beams for both the uplink and downlink signals so that a high data rate can be obtained on the uplink and downlink with a small dish size. For example, the effective radiated power ("ERP") requirement for the uplink transmit antenna is typically $\frac{1}{100}$ of a Ku-band SATCOM systems currently in use and $\frac{1}{10}$ of announced Ka-band systems.

Figure 5:
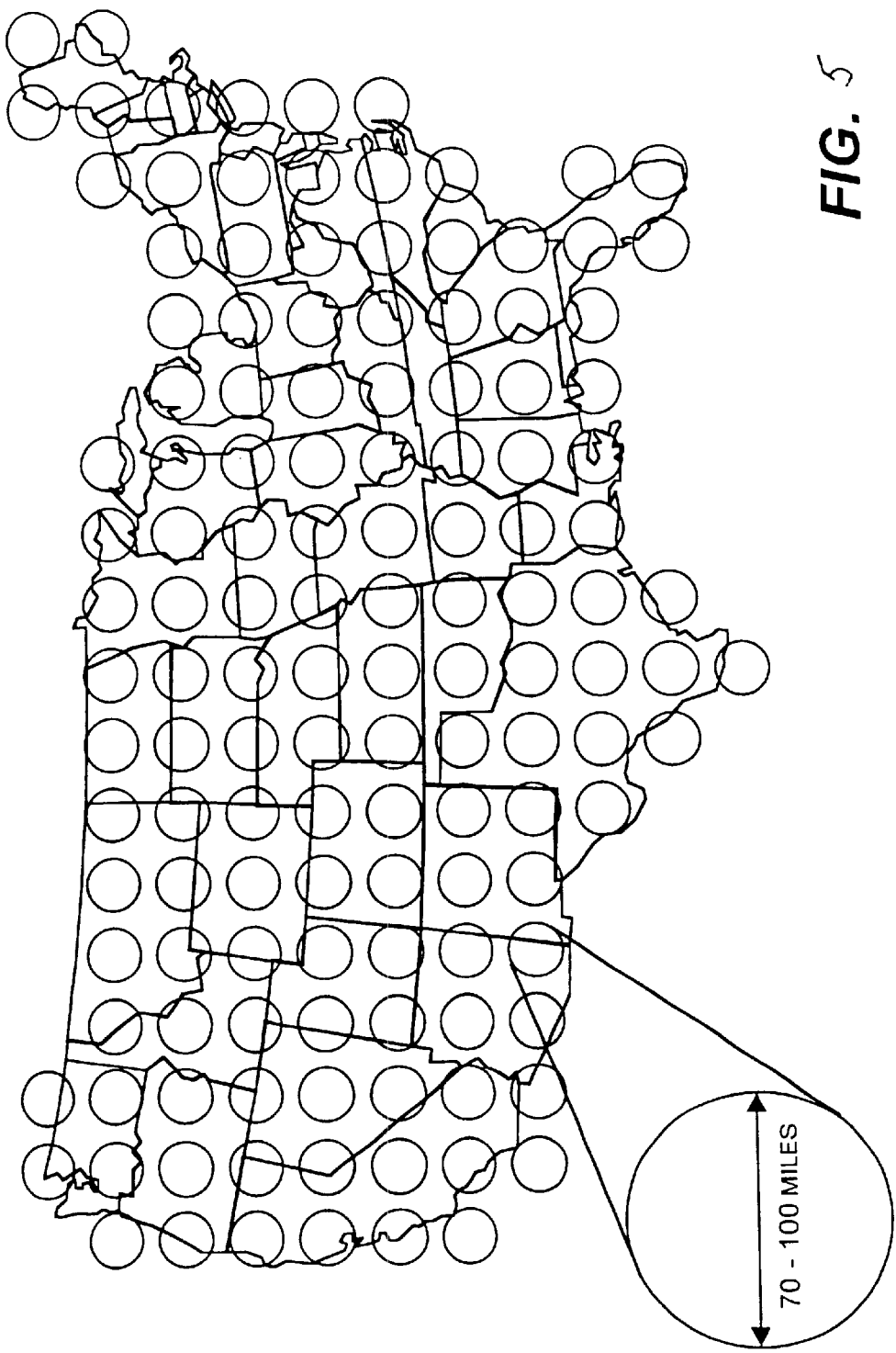
FIG. 5 is an illustration of a representative spot beam coverage pattern of the CONUS in accordance with an exemplary embodiment of the present-invention.

FIG. 5, illustrates a spot-beam coverage pattern of CONUS used by an exemplary embodiment of the present invention. The coverage pattern typically comprises a network of equally sized spot-beams covering selected areas of the CONUS. Typically, each spot beam may have a diameter between seventy (70) and one hundred (100) miles. The spot beams can be equally spaced to provide a substantially uniform coverage of the CONUS. In the alternative, the spot beams can be focused on selected areas of the CONUS.

Figure 6:
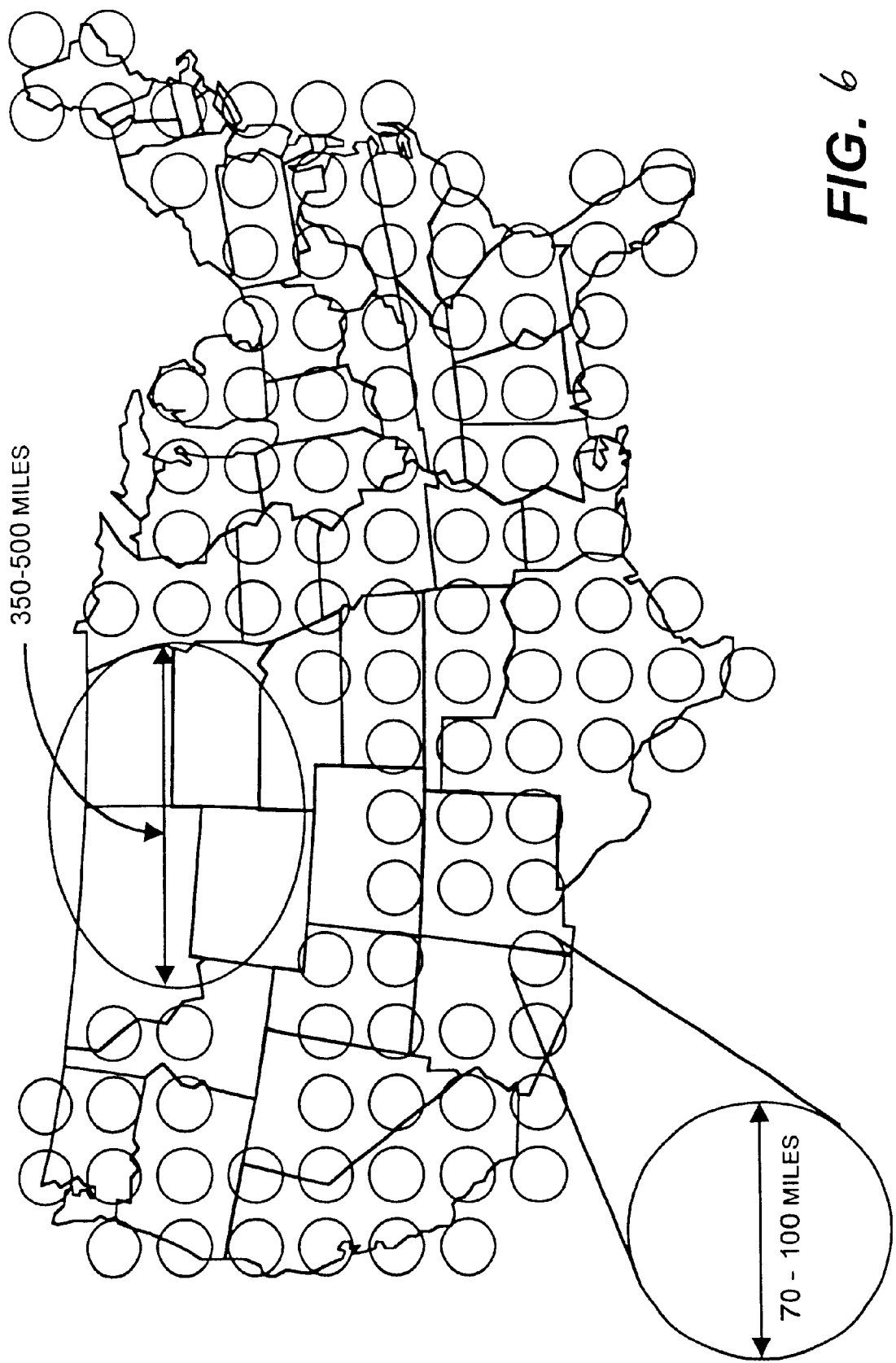
FIG. 6 is an illustration of an alternative spot beam coverage pattern of the CONUS in accordance with an exemplary embodiment of the present invention.

FIG. 6 illustrates an alternative spot beam coverage pattern for CONUS using an exemplary embodiment of the invention. In this pattern, a network of equally sized, equally spaced spot beams are arranged to provide coverage for areas having a high demand for services. Additionally, in areas where demand may be low, such as. the northern plains states, a single, larger spot beam may be used to provide coverage. As the demand for services grows in the less populated areas, additional spot beams may be added to provide to meet the demand.

Additionally, the spot beams may be arranged in an uneven distribution to provide greater coverage in heavily populated areas and provide less coverage in less densely populated areas. Furthermore, spacing of individual spot beams may be dynamically altered to provide greater additional coverage in a high growth area to meet the demand. For example, the eastern and western seaboards of the United States each have a greater population than the northern plains states. Therefore, the density of spot beams along the East and West coasts may be higher than the density of spot beams over the northern plains states. Additional spot beams can be added to provide additional coverage as the demand for SATCOM services increases.

One application of the hub service supported by the present invention is Internet Access for both data and multi-cast broadcasting. A protocol similar to the DVB format allows the system to provide selected types of data interchangeably. Another type of service supported by the use of a hub in each spot beam is regional data multi-casting/broadcasting, in which all local TV stations are broadcast within a region. Yet another service could be national data multi-casting/broadcasting, in which the data broadcast is the same in every spot beam. This could implement the broadcast of nationally televised programming, or nationally broadcast data-casting.

Figure 7:
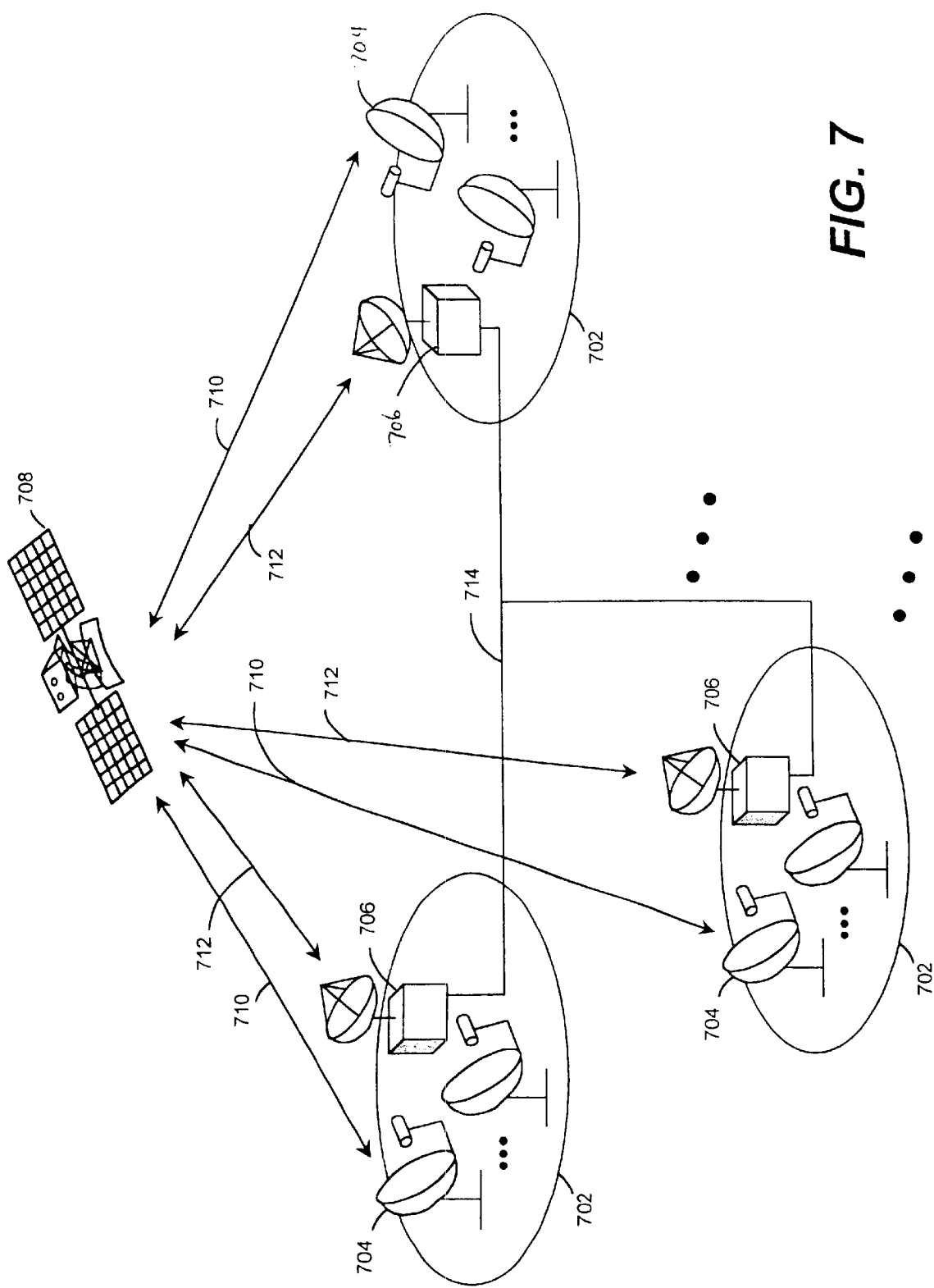
FIG. 7 is an illustration of an exemplary embodiment operating in an intra-spot beam mode.

FIGS. 7, 8, 9, 10 and 17 are illustrations of exemplary embodiments of the invention. FIG. 7 illustrates a multi-beam SATCOM system 20 with a hub 706 in every beam 702 operating in an intra-spot beam mode. In the SATCOM system 20, each spot beam 702 is spatially isolated from every other spot beam. This allows the SATCOM system 20 to achieve maximum frequency re-use. In contrast, for SATCOM systems in which the spot beams are contiguous, or overlap, signals from adjacent spot beams cause interference.

To overcome the interference from adjacent spot-beams, the SATCOM system 20 uses a frequency assignment, in which the frequency bands used for the uplink and downlink signals 710 are divided into several sub-bands, typically between four (4) and seven (7) sub-bands. For example, if a SATCOM system uses four contiguous spot beams to cover CONUS, the uplink and downlink frequency bands would be divided into four sub-bands. Each spot beam would be assigned a separate sub-band for use on the uplink and downlink signal. Although using a frequency assignment limits the interference between adjacent spot beams, the effective bandwidth available is reduced by one quarter. By spatially isolating each spot beam from every other spot beam according to an embodiment of the invention, there is no interference. Therefore, sub-bands are not necessary and the entire frequency band is available for use in every spot beam. Spatially isolating the spot beams increases the bandwidth available for signal transmission by a factor of four.

In the case of intra-beam configuration, the ground terminals 704 and hub 706 are located within the same beam. The intra-beam configuration operates in a similar manner to the "hub" configuration discussed above. A single ground terminal 704 transmits a signal on the uplink frequency to the satellite 708, which retransmits the signal on the downlink frequency to another ground terminal 704. The satellite 708 then transmits the signal on the downlink frequency to the appropriate ground terminal 704.

If a ground terminal 704 in a first spot beam wishes to communicate with a ground terminal 704 in a second spot beam, the first ground terminal transmits a signal 710 on the uplink frequency to the satellite 708, which retransmits the signal 712 on the downlink frequency to the hub 706 within the same spot beam. The signal is then routed over a land-based, high-speed wide-area network (WAN) 714 to the hub 706 in the same spot beam as the second ground terminal. The hub 706 transmits the signal on the uplink frequency to the satellite 708 for retransmission to the second ground terminal over the downlink frequency.

In a similar manner, a one-way broadcast signal may be transmitted to every spot beam. The one-way broadcast may originate from a ground terminal located in a single spot beam. The broadcast signal is transmitted to the GEO satellite, which re-transmits the broadcast to the hub located in the same spot beam. The signal may originate from the hub or from a source outside the network through the WAN. The hub then transmits the broadcast signal to the GEO satellite, which retransmits the signal to every ground terminal in the spot beam.

Figure 8:
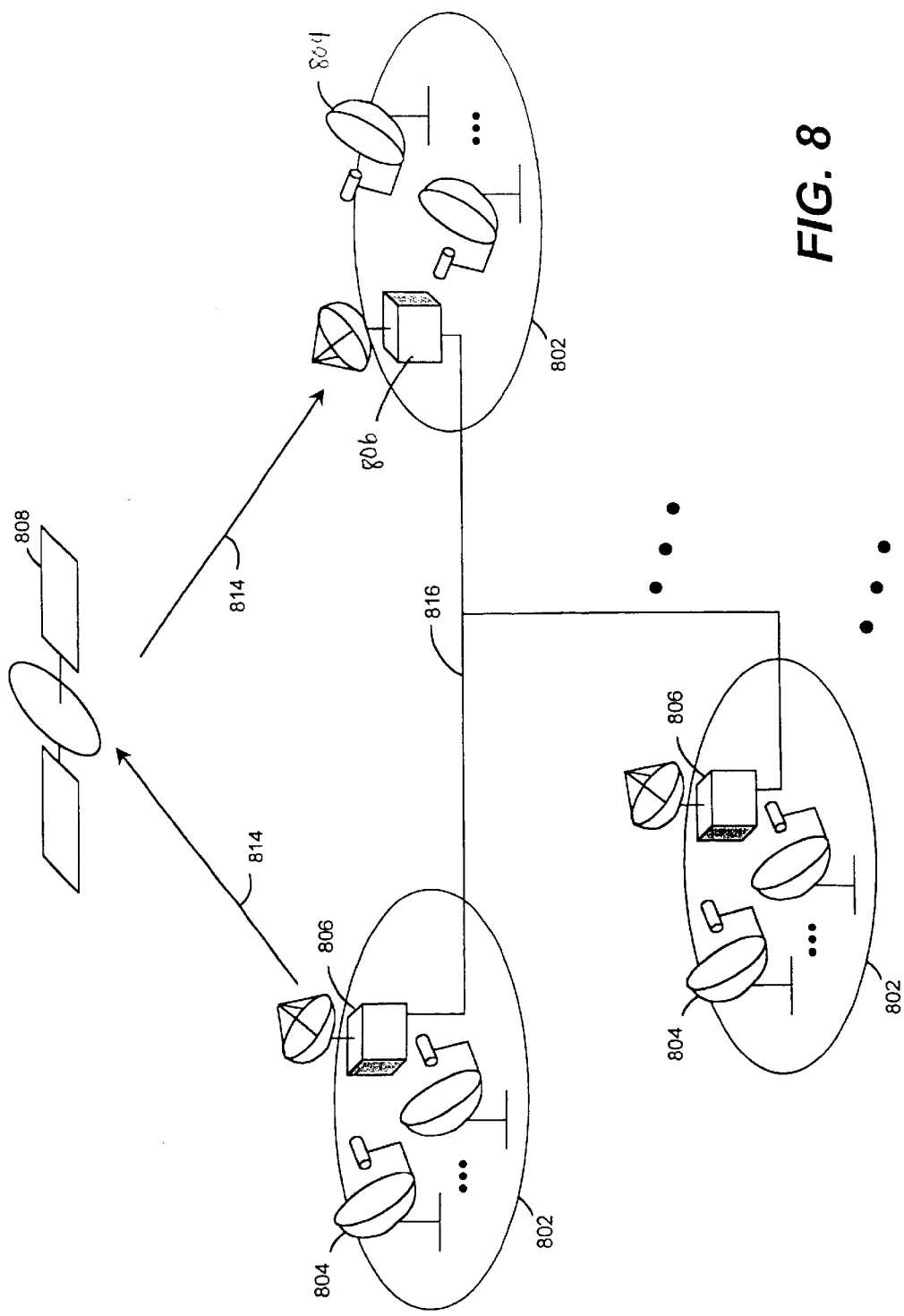
FIG. 8 is an illustration of an exemplary embodiment operating in the inter-spot beam mode.

FIG. 8 is an illustration of an exemplary embodiment operating in the inter-spot beam configuration. In this configuration, each hub 806 in a spot beam 802 communicates with another hub in another spot beam through the GEO satellite 808 in a hub-to-hub link 814. This allows individual terminals 804 in a first spot beam to communicate with individual terminals 804 in a second spot beam. First, a ground terminal 804 in a first spot beam transmits a signal to the GEO satellite 808, which retransmits the signal to the hub 806 located in the first spot beam. The hub 806 determines the appropriate hub to which to route the signal. Once the signal processing is complete and the signal routed to the appropriate hub via the network link numbered 816, the signal is transmitted by the hub 806 in the first spot beam to the GEO satellite 808, which retransmits the signal to the hub 806 in the second spot beam. Finally, the hub numbered 806 in the second spot beam transmits the signal to the appropriate ground terminal 804 in the second spot beam, or to the GEO satellite 808.

Figure 9:
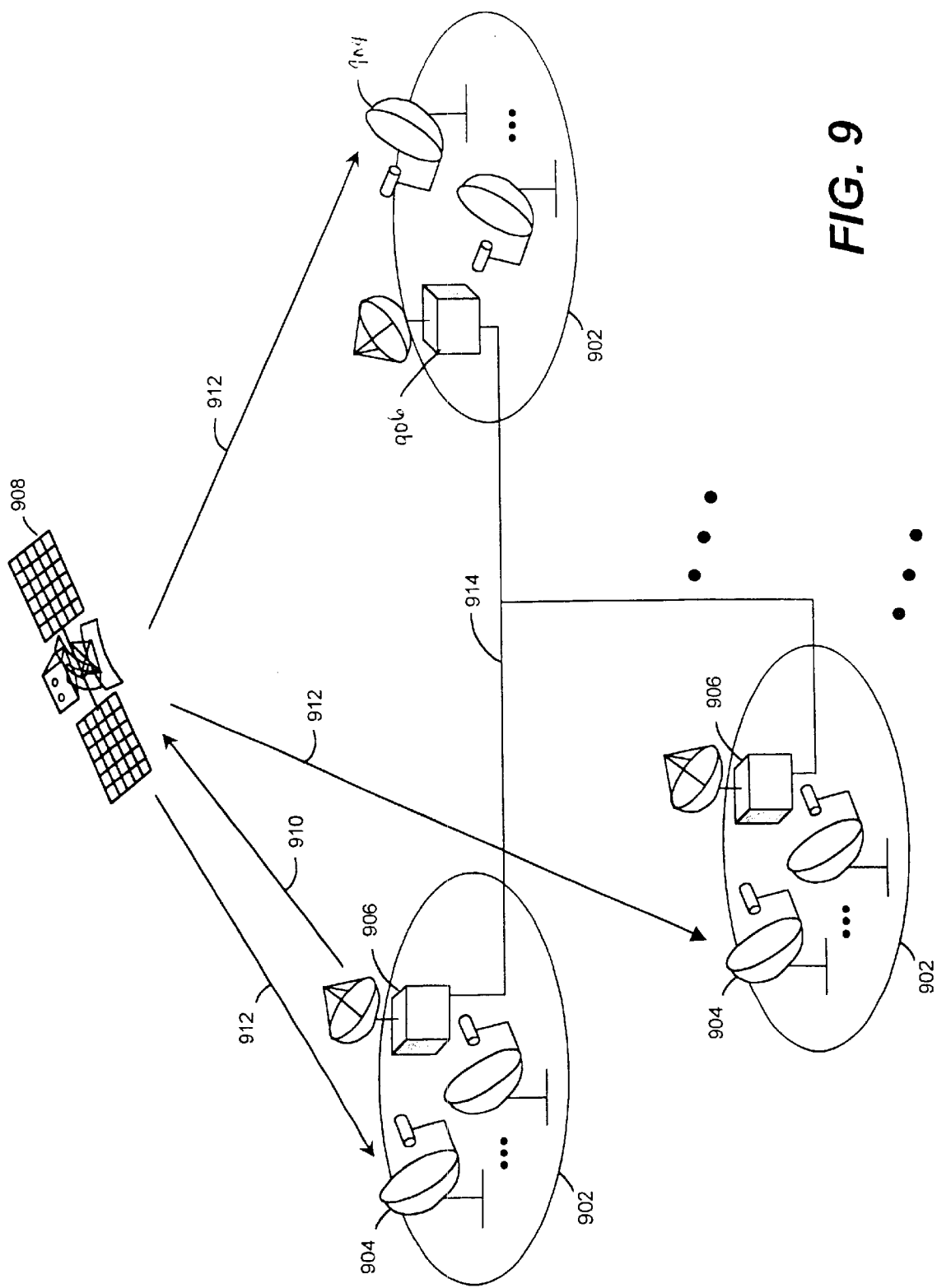
FIG. 9 is an illustration of an exemplary embodiment operating in the broadcast mode.

FIG. 9 is an illustration of an exemplary embodiment operating in an inter-beam broadcast configuration. A hub 906 in a first spot beam transmits a broadcast signal 910 on the uplink frequency to the GEO satellite 908. The GEO satellite 908 receives the broadcast signal 910, shifts the signal frequency, to the downlink frequency and re-transmits a signal 912 to each spot beam 902. The broadcast signal 910 may originate from either an individual land-based terminal 904 or from the hub 906 located in the spot beam. The hub 906 in each spot beam 902 can communicate with the remaining hub via a network link 914.

The broadcast signal 910 may be transmitted in one of two ways. First, the signal may be a local broadcast signal intended only for reception by ground terminal within the spot beam where the signal originated. For example, in the greater Atlanta area, a local broadcast, such as a local news broadcast, is typically intended to be seen only by viewers within the greater Atlanta area. Each news agency may transmit their broadcast signal directly from a ground terminal or may route the signal through a local hub centrally located within the spot beam. The local news broadcast signal is transmitted to the GEO satellite, which re-transmits the signal to viewers residing in the greater Atlanta area.

Secondly, the broadcast signal may be a locally generated signal within an individual spot beam intended for national broadcast. Under this scenario, an individual ground terminal or a local hub located within a first spot beam transmits a broadcast signal to the GEO satellite on the uplink frequency. The GEO satellite then broadcasts the signal into every spot beam where it is received by the individual ground terminals. An example of this mode of broadcast signal would be a national news service, such as Cable News Network (CNN), which is located in Atlanta, Ga. The CNN broadcast signal, which originates in Atlanta, is transmitted from an individual ground terminal in the spot beam providing coverage to the greater Atlanta area to the GEO satellite. The GEO satellite then re-broadcasts the signal not only to each ground terminal in the same spot beam, but to each ground terminal in every spot beam.

Figure 10:
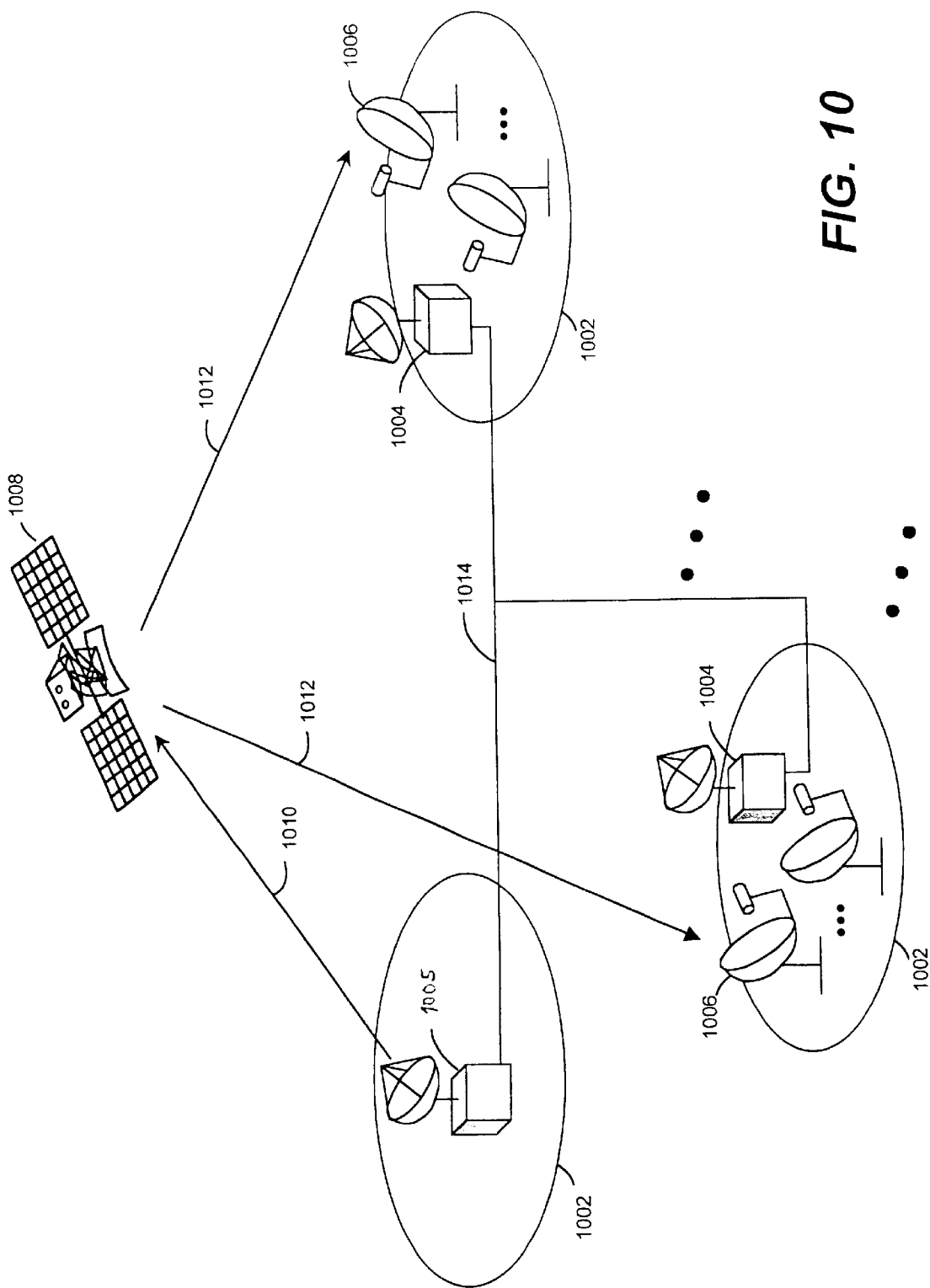
FIG. 10 is an illustration of an exemplary embodiment operating in the remote hub broadcast mode.

FIG. 10 is an illustration of an exemplary embodiment operating in a remote hub broadcast configuration. Again, the SATCOM system comprises a series of spot beams 1002 originating from the satellite 1008 and illuminating the earth surface. At least one spot beam 1002 encompasses only a single, remote hub 1005. Each of the remaining spot beams 1002 encompass a number of ground terminals 1006 and a single hub 1004. Typically, the spot beam that encompasses the remote hub is the same size as the other spot beams in the network. However, the remote hub may be located in a remote portion of the CONUS, where the demand for satellite service is low, such as in the Northern Plains States. In this case, the spot beam covering the remote hub may be considerably larger or smaller than the remaining spot beams.

The remote hub 1005 may receive a national broadcast signal 1012, which originates from any specified source. The signal is fed to the remote hub 1005 through a WAN 1014 for transmission to the GEO satellite 1008. For example, the broadcast signal 1012 may be a national broadcast signal that is intended to be transmitted to every ground terminal in the CONUS. For example, a national news agency, such as the National Broadcasting Company (NBC) may transmit its broadcast signal 1010 from the remote hub to the GEO satellite for transmission back to every ground terminal. Alternatively, every hub 1004 may be connected to the remote hub 1005 through the WAN 1014. Each hub 1004 could then send the local broadcast signal to the remote hub 1005 via the WAN 1014 for transmission on the national broadcast signal, whenever local events warranted broadcasting news on a national scale.

Figure 11:
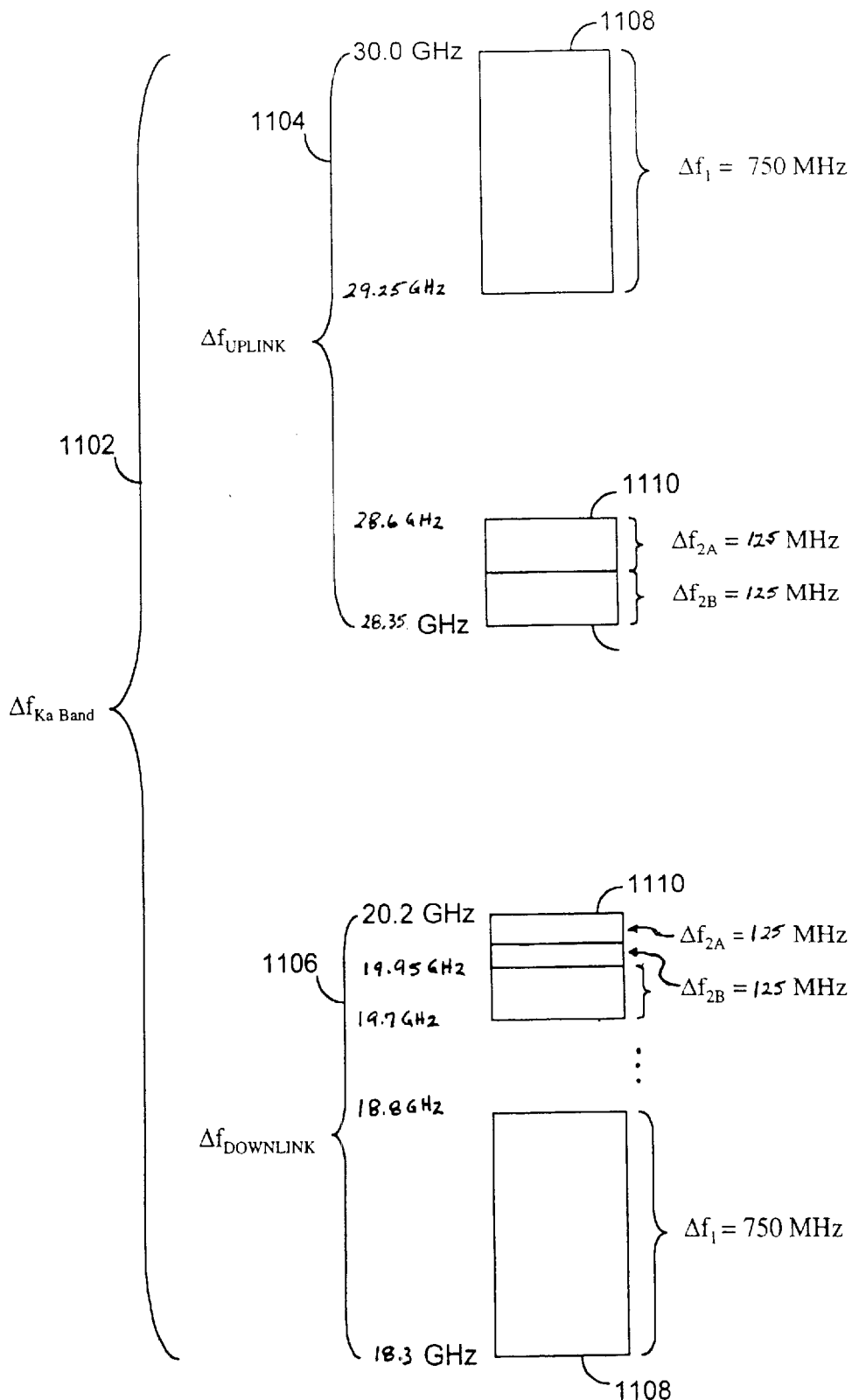
FIG. 11 is an illustration of the frequency allocation of the uplink signal and the downlink signal for inter-spot beam mode based on signal frequency for an exemplary embodiment of the present invention.

FIG. 11 is an illustration of the frequency allocation of the uplink signal and the downlink signal for inter-spot beam configuration based on signal frequency in accordance with an exemplary embodiment of the present invention. Specifically, FIG. 11 illustrates an exemplary frequency allocation for the Ka-band frequencies 1102, which typically range between 18.3 GHz and 30.0 GHz. The Ka-band frequency typically has an uplink frequency band 1104 ranging from about 28.35 GHz to about 30.0 GHz and a downlink frequency band 1106 ranging from about 18.3 GHz to about 20.2 GHz. The uplink and downlink frequency bands may further be divided into sub-bands. The first sub-band 1108 may be used for the broadcast transmission and is typically 750 MHz wide to support hubs which provides a nearly symmetrical data rate over a 36 MHz bandwidth. It will be appreciated that the frequency allocation defined in FIG. 11 represents only one of many possible different allocations of the frequency spectrum to support the exemplary satellite communication system.

The second sub-band 1110 may be used for a SATCOM return channel from individual terminals. The second sub-band is typically 250 MHz wide and supports 250 individual ground terminals each with a 1 MHz bandwidth. The use of the two separate bandwidths in the two sub-bands allows the SATCOM system to have an asymmetrical data rate that is characteristic of most Internet access, i.e., a low-speed uplink data rate and a high-speed downlink data rate to minimize transmitter power and dish size for the ground terminal.

The SATCOM ground terminal typically provides high gain uplink spot beams, thereby minimizing the need for ground terminal with a high effective radiated power (ERP). Additionally the SATCOM ground terminal may provide a high power SATCOM transmitter into the narrow downlink spot beam, which minimizes the size of the receiving aperture on the ground. Typical uplink data rates are envisioned in the 1–2 million bits per second (Mbps), while the downlink will provide peak rates of 20–40 Mbps. The uplink air interface typically will be frequency division multiple access (FDMA) with time division multiple access (TDMA) overlaid to further accommodate lower data rates. For example, the downlink air interface may be DVB-S, a well-accepted protocol which can accommodate a combination of MPEG-2 video and data. The important point is that the hub service allows for different air interfaces on the uplink/downlink without on-board processing on the satellite.

For intra-beam services, a portion of the second uplink band used by the ground terminals is allocated to the "intra-beam" service and depicted as $\Delta f_{2A}$. This portion of the band is then filtered at the input of each receive spot beam. The designation of an "inter-beam" signal may also be accomplished by restricting part of the band to the "inter-beam segment, shown as $\Delta f_{2B}$.

Because the frequency of each ground terminal and hub are assigned and coordinated within the system, not only the ground terminals but also the hub can provide "intra-beam" and "inter-beam" communications. This allows the introduction of a new concept of a high-speed ground terminal that uses the same uplink format as the hub. This terminal will be referred to as a "commercial" terminal, or as a "remote hub." These terminals can transmit into the "intra-beam" service, or into the "inter-beam" or broadcast service, in the same way as the ground terminals using a different part of the uplink band with a different air interface. For example, a "remote hub" in one spot beam is assigned a frequency or polarization that is allocated to "broadcast", and that channel is broadcast into all downlink beams.

Figure 12:
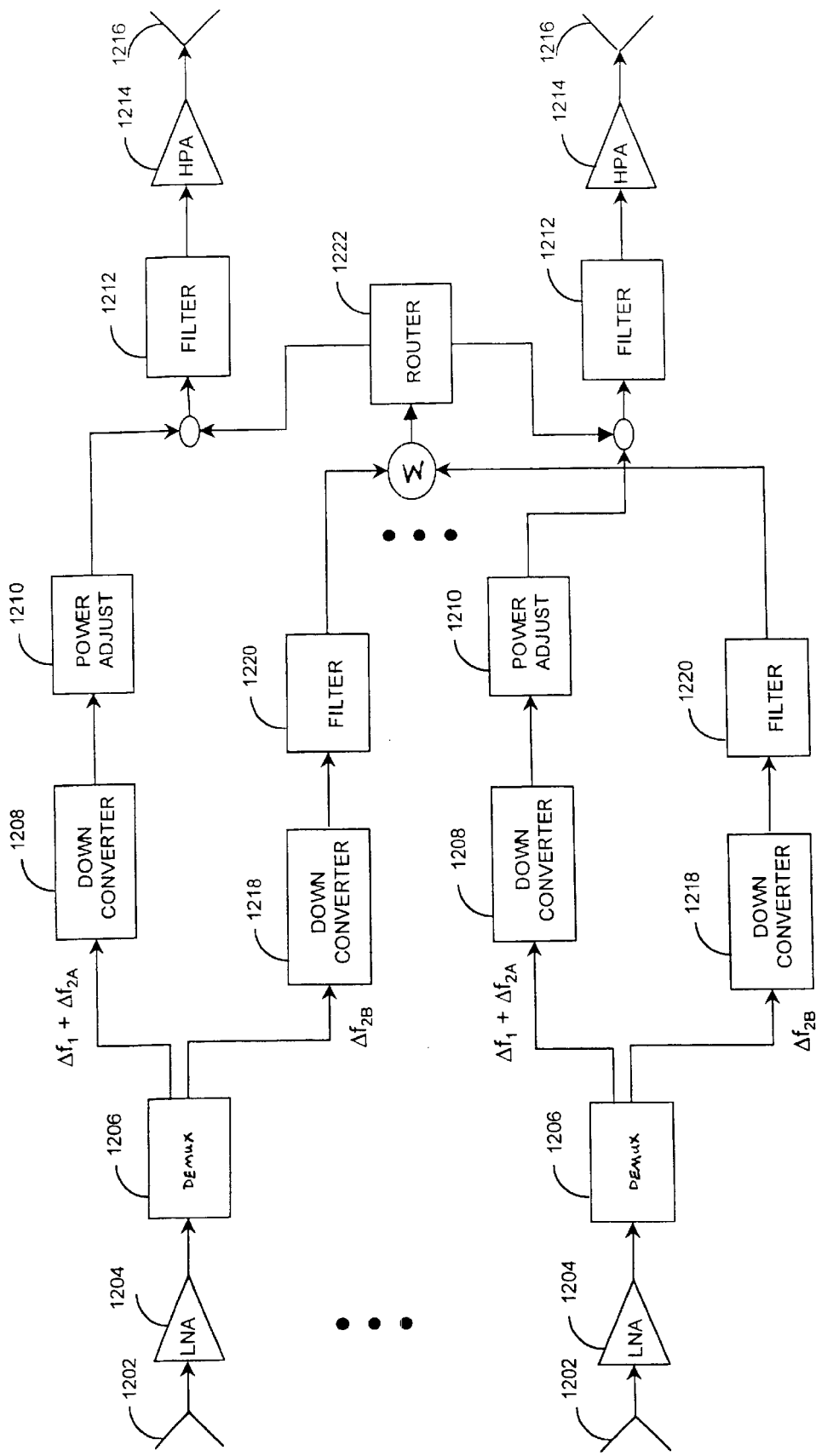
FIG. 12 is an illustration of a frequency-based router circuit used for the inter-spot beam mode in accordance with an exemplary embodiment of the present invention.

FIG. 12 is an illustration of an exemplary frequency-based router circuit used for the inter-spot beam configuration. The frequency-based router circuit consists of n identical circuits connected to a single router 1222, where n is the number of spot beams used by the SATCOM system. An uplink signal, comprising both the first and second sub-bands, enters the router through one of the antennas 1202 and is then amplified by a linear LNA 1204. The signal then passes through a demultiplexer 1206, or "demux," which separates the signal into two signals. The first signal is used for intra-beam routing and consists of the broadcast signal in the first sub-band $\Delta f_1$. and the intra-beam segment $\Delta f_{2A}$ signal. The intra-beam signal then passes though a down-converter 1208, which shifts the frequency to the downlink frequency. Next, the intra-beam signal passes through a power adjust circuit 1210, in which the output transmission power is set. Next, the intra-beam signal is filtered in a filter 1212 to remove unwanted noise from the signal. Finally, the signal passes through an amplifier 1214 before it is transmitted via antenna 1216 on the downlink to the ground terminals located within the same spot beam.

The second signal is used for inter-beam routing, which consists of the inter-beam portion, $\Delta f_{2B}$ of the second sub-band. The inter-beam portion, $\Delta f_{2B}$ of the second sub-band is further separated into n equal segments, where n is the number of spot beams employed by the SATCOM system. Each segment directly corresponds to an individual spot beam (i.e., the first segment corresponds to the first spot beam, the second segment corresponds to the second spot beam, etc.). The frequency of the inter-beam signal is shifted to the downlink frequency by passing the signal through a second downconverter 1218. The signal then passes through a filter 1220 to remove unwanted noise before passing through a router 1222. The router 1222 then redirects the signal to the appropriate antenna 1216, depending on which segment of the inter-beam frequency, $\Delta f_{2B}$ was used to transmit the signal. For example, if the signal is placed in the first segment of the sub-band, the router will redirect the signal to the antenna corresponding to the first spot beam, and so on. The inter-beam signal is filtered by the filter numbered 1212 and amplified by the amplifier 1214 before being transmitted through the appropriate spot beam to the second ground-terminal.

Figure 13:
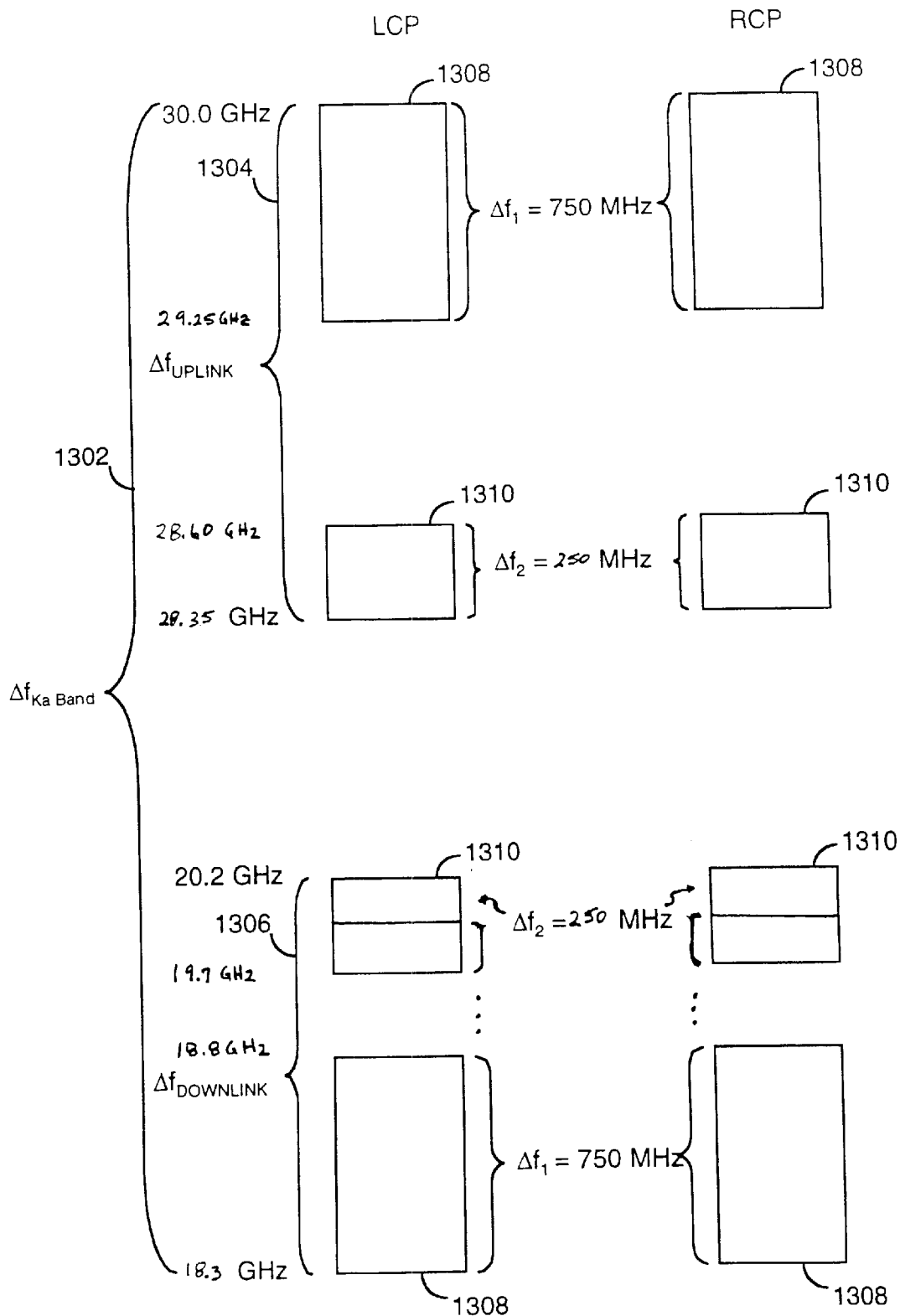
FIG. 13 is an illustration of the frequency allocation of the uplink signal and the downlink signal for inter-spot beam mode based on signal polarization in accordance with an exemplary embodiment of the present invention.

FIG. 13 is an illustration of the frequency allocation of the uplink signal and the downlink signal in the Ka-band frequency for use with polarization-based routing in the inter-spot beam mode in accordance with an exemplary embodiment of the present invention. The frequency allocation 1302 for the Ka-band typically range between 18.3 GHz and 30.0 GHz. The Ka-band frequency typically has an uplink frequency band 1304 ranging from about 28.35 GHz to about 30.0 GHz and a downlink frequency band 1306 ranging from about 18.3 GHz to about 20.2 GHz. However, there are two identical channels for the uplink and the downlink frequencies: one for a right circularly polarized (RCP) signal and a second channel for a left circularly polarized (LCP) signal.

The uplink and downlink frequency bands may be further divided into sub-bands. The first sub-band 1308 may be used for broadcast transmission and is typically 750 MHz wide. The second sub-band 1310 may be used for a SATCOM return channel from individual hubs and is typically 250 MHz wide.

Each SATCOM ground terminals would employ a dual polarized uplink antenna with a switchable transmitter that could excite either polarization. For one polarization, such as RCP, the received signal on the satellite would go through the normal bent pipe processing into the same downlink spot beam. For the other uplink polarization, such as LCP, the received signal would be channeled through the on-board a polarization-based router to each of the other spot beams. Those skilled in the art will appreciate that the frequency allocation defined in FIG. 13 represents only one of many possible different allocations of the frequency spectrum to support the exemplary satellite communication system.

Figure 14:
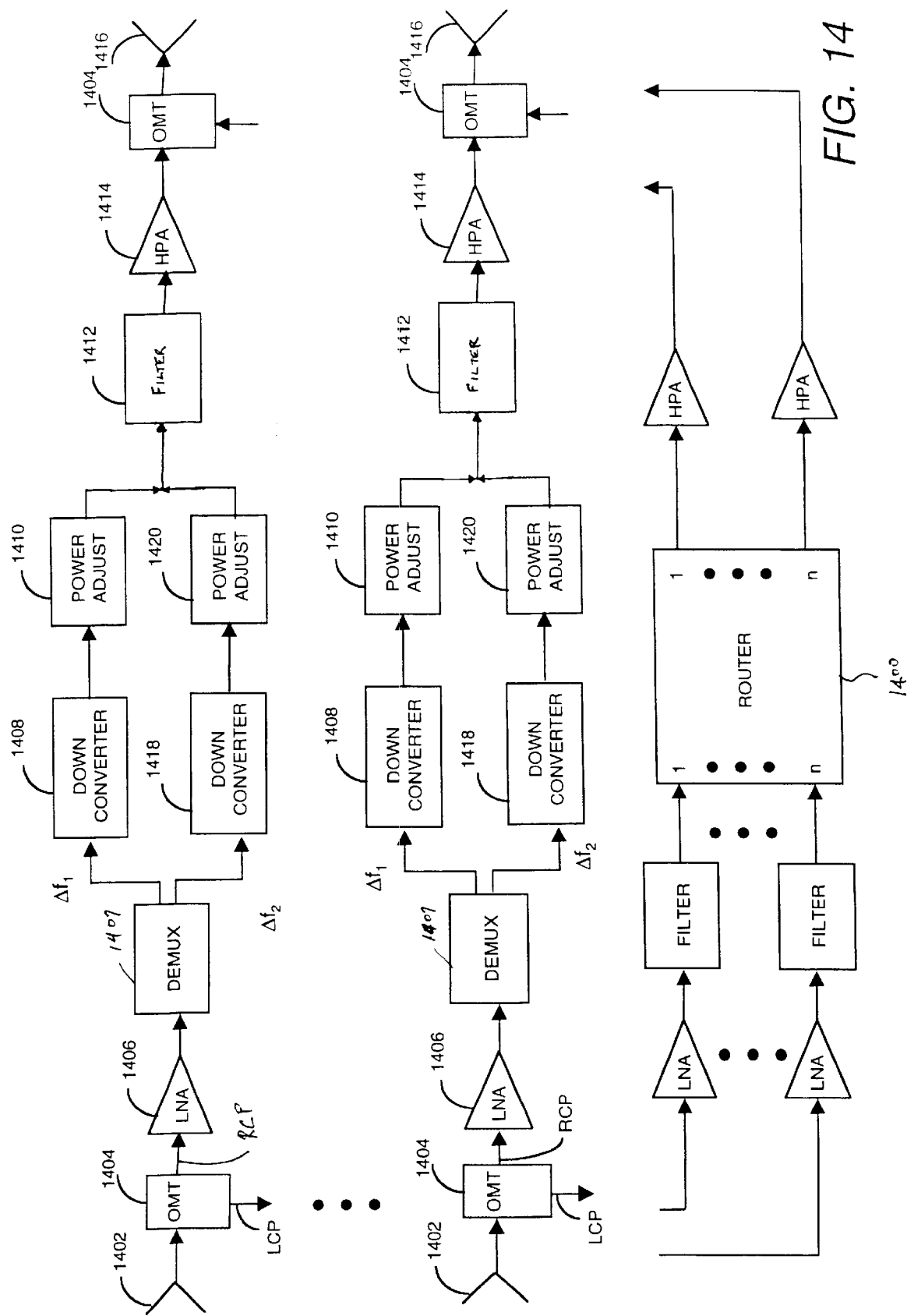
FIG. 14 is an illustration of a polarization-based router circuit used for inter-spot beam mode in accordance with an exemplary embodiment of the present invention.

FIG. 14 is an illustration of an exemplary polarization-based router circuit used for inter-spot beam mode. The uplink signal, containing both RCP and LCP signals, is passed by an antenna 1402 and split into two separate signals by an orthogonal mode transducer (OMT) 1404. The LCP signal, which is used for inter-beam communications, is directed to a router 1400 for transmission to the appropriate spot beam. The LCP signal is amplified and filtered before entering the router 1400, where, in turn, the signal is directed to the appropriate spot beam.

The RCP signal, which is used for intra-beam communications and contains both the broadcast signal and the ground terminal return signal, passes through an amplifier 1406 before being separated by a demultiplexer 1407. After the two signals are separated, downconverters 1408, 1418 shift each signal to the downlink frequency. The signals then pass through power adjust circuits 1410, 1420 to adjust the amplitude of the signals. Next, the signals are combined and passed through a filter 1412 before being amplified by a high power amplifier 1414. The RCP signal then passes through another orthogonal mode transducer 1404 where it is combined with an LCP signal intended for inter-beam communications. The combined signal is transmitted by an antenna 1416.

Figure 15:
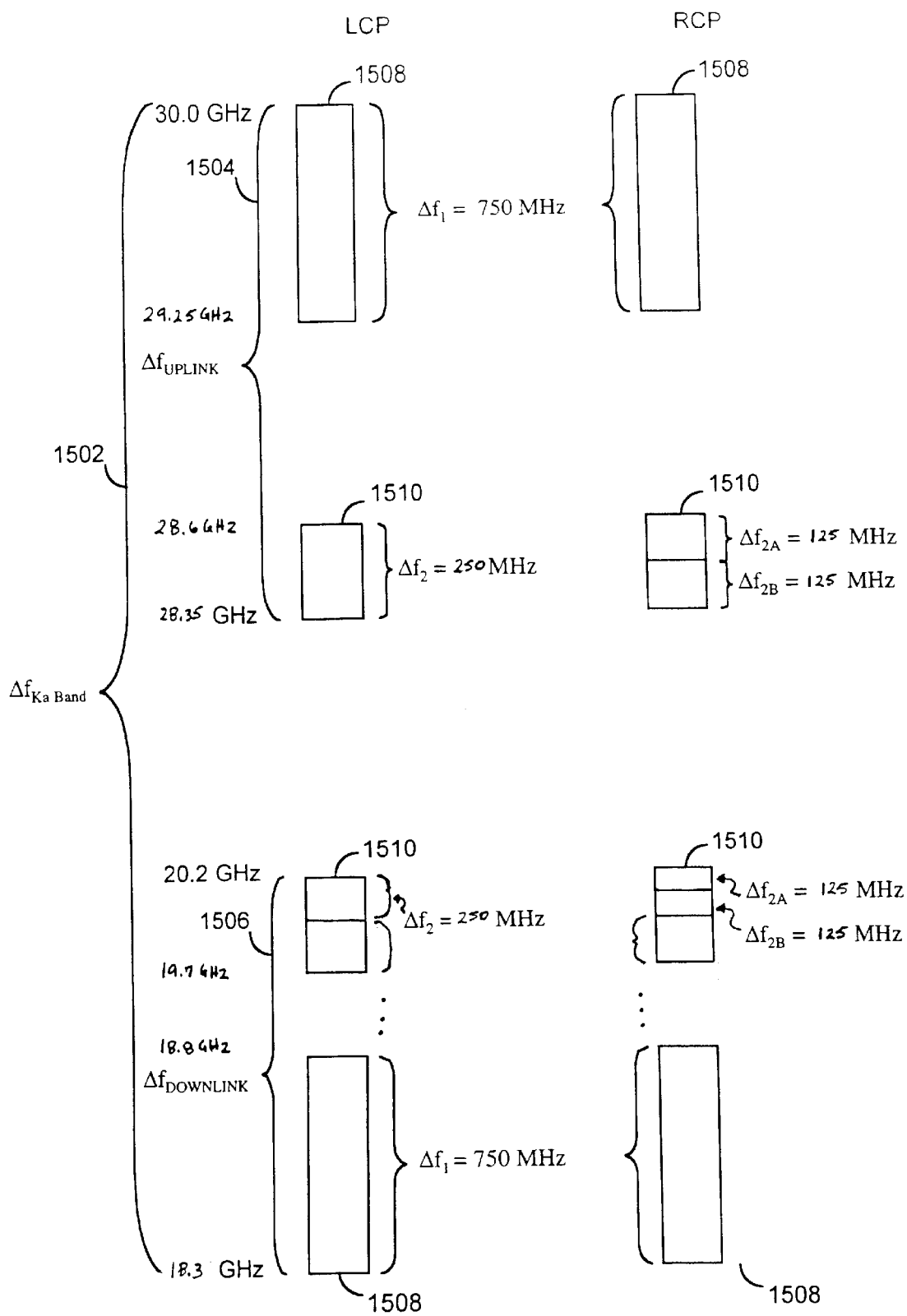
FIG. 15 is an illustration of the frequency allocation of the uplink signal and the downlink signal for an inter-spot beam mode based on both frequency and polarization of the signals in accordance with an exemplary embodiment of the present invention.

FIG. 15 is an illustration of the frequency allocation of the Ka-band signal for an inter-spot beam router configuration based on both frequency and polarization of the signal in accordance with an exemplary embodiment of the present invention. The Ka-band 1502 is divided into an uplink band 1504 with a frequency of $\Delta f_{uplink}$, and a downlink band 1506 with a frequency of $\Delta f_{downlink}$. Each uplink band and downlink band has two signals, one signal having a left hand circular polarization and the other signal having a right hand circular polarization. The uplink and downlink frequency bands may be further divided into sub-bands. A first sub-band 1508 may be used for broadcast transmission and is typically 750 MHz wide. A second sub-band 1510 may be used for a SATCOM return channel and is typically 250 MHz wide. It will be appreciated that the frequency allocation illustrated in FIG. 15 represents only one of many possible different allocations of the frequency spectrum to support the exemplary satellite communication system.

Figure 16:
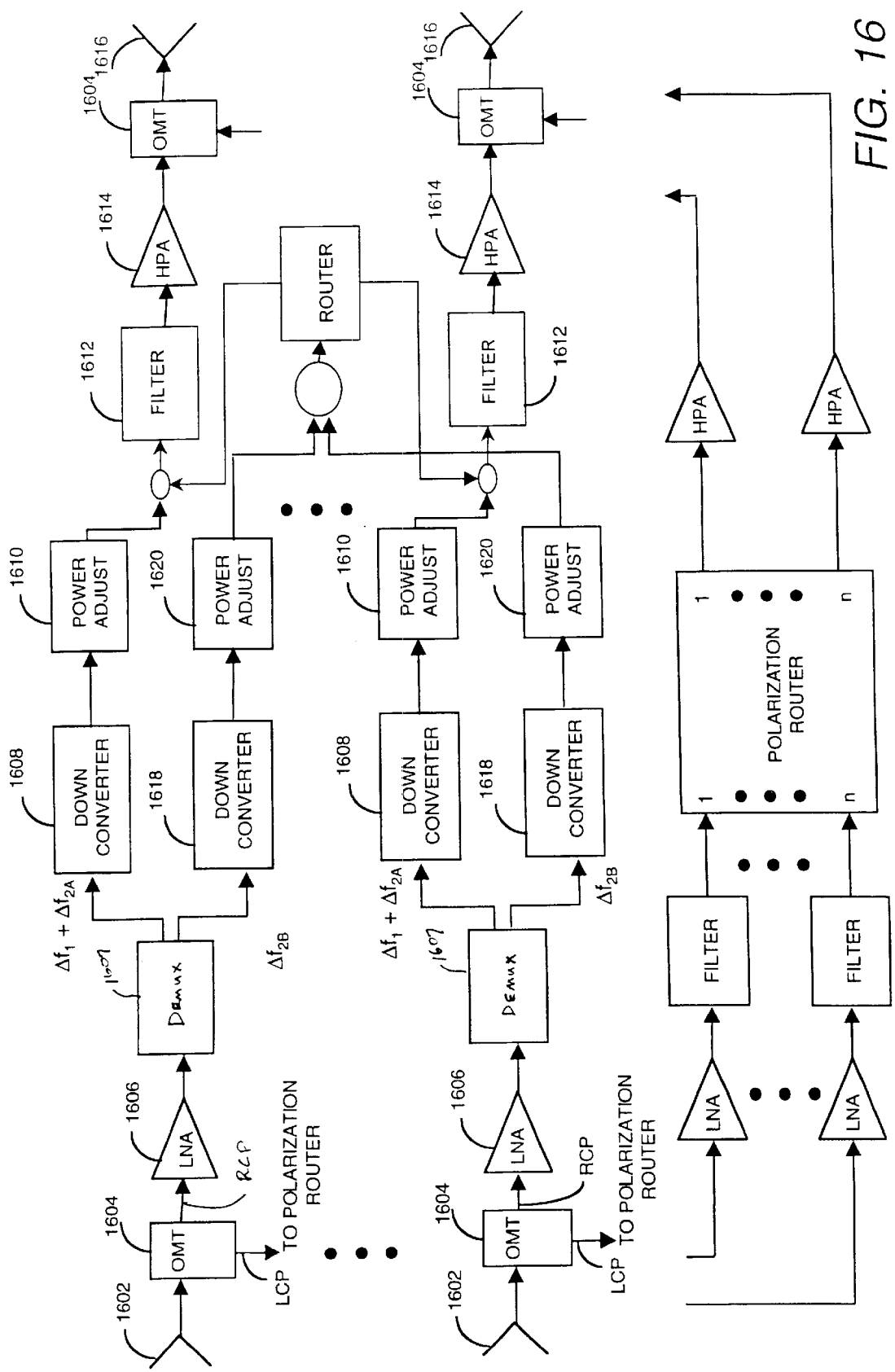
FIG. 16 is an illustration of a combination frequency/polarization-based router circuit used for inter-spot beam mode in accordance with an exemplary embodiment of the present invention.

FIG. 16 is an illustration of a combination frequency/polarization-based router circuit used for inter-spot beam mode communications on board a satellite in accordance with an exemplary embodiment of the present invention. Specifically, FIG. 16 illustrates an exemplary circuit used for routing of the user uplink based on polarization and frequency of the MF/TDMA return channel. The satellite ground terminal would employ a dual polarized uplink antenna with a switchable transmitter that could excite either polarization. For the LCP uplink polarization, the received signal would be channeled through the on-board router to other spot beams. For the RCP, the received signal is separated into 2 sub-bands by a demultiplexer. One sub-band is downconverted and routed to the appropriate beam by the frequency router. The other sub-band would go through the normal bent pipe processing into the same downlink spot beam.

Referring still to FIG. 16, the uplink signal, containing both RCP and LCP signals, is passed by an antenna 1602 and split into two separate signals by an orthogonal mode transducer (OMT) 1604. The LCP signal, which is typically used for inter-beam communications, is directed to a router 1600 for transmission to the appropriate spot beam. The LCP signal is amplified and filtered before entering the router 1600, where, in turn, the signal is directed to the appropriate spot beam.

The RCP signal, which is typically used for intra-beam communications and contains both the broadcast signal and the ground terminal return signal, passes through an amplifier 1606 before being separated by a demultiplexer 1607. After the two signals are separated, down coverters 1608, 1618 shift each signal to the downlink frequency. The signals then pass through power adjust circuits 1610, 1620 to adjust the amplitude of the signals. Next, the signals are combined and passed through a filter 1612 before being amplified by a high power amplifier 1614. The RCP signal then passes through another orthogonal mode transducer (OMT) 1604, where it is combined with an LCP signal intended for inter-beam communications. The combined signal is transmitted by an antenna 1616.

Figure 17:
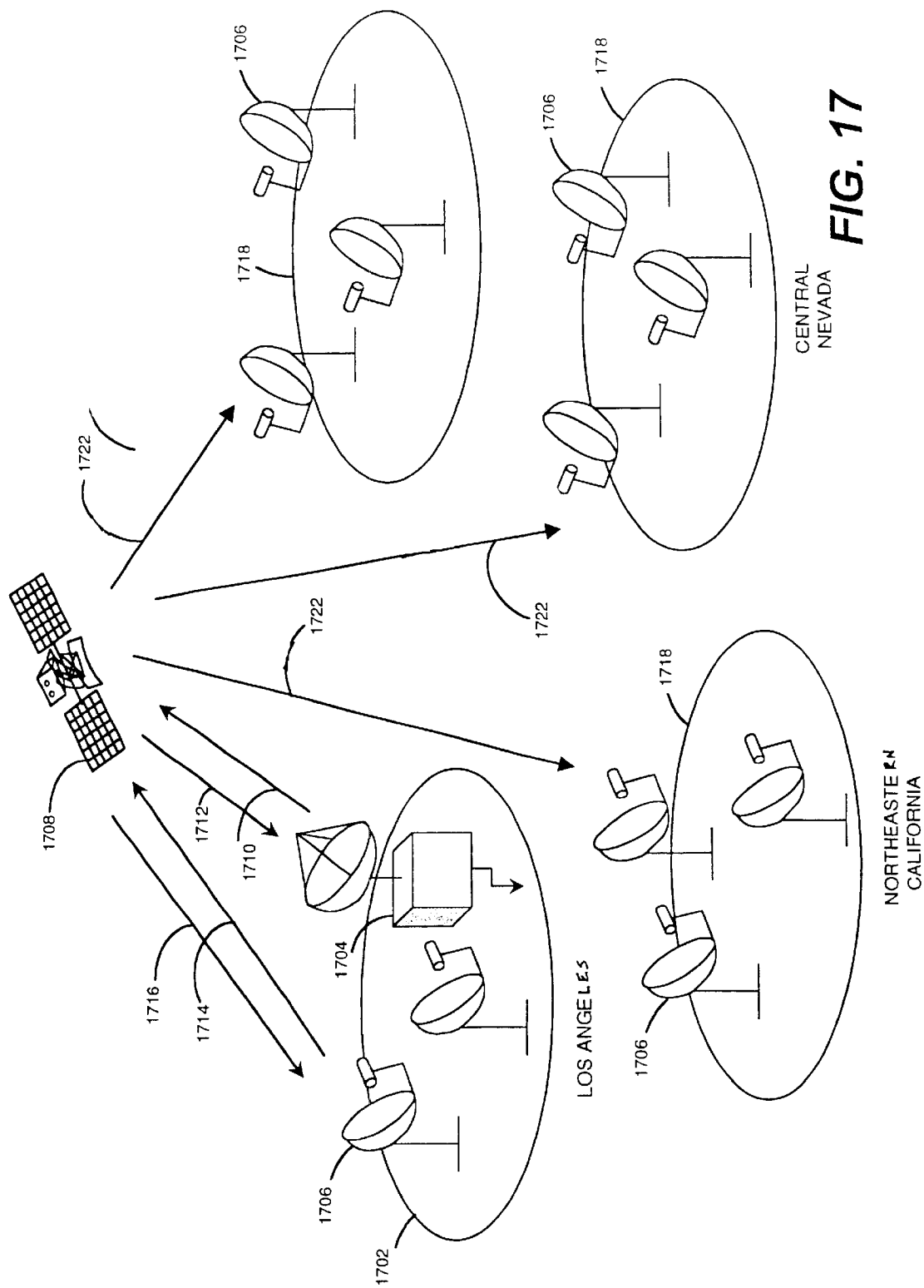
FIG. 17 is an illustration of a parent-dependent SATCOM inter-beam configuration in accordance with an exemplary embodiment of the present invention.

FIG. 17 illustrates a parent-dependent configuration for the inter-beam mode, in which a hub 1704 is installed in the parent beam 1702 but not in the dependent beams 1718, in accordance with an exemplary embodiment of the present invention. If a hub is not installed in a spot beam, the exemplary embodiment allows for an inter-beam access from a ground terminal 1706 to a hub in another spot beam. This allows the ground terminal to access downlinks for the inter-beam broadcast service, but not the "local channel" delivery service. The parent-dependent configuration may be used for highly populated areas that are surrounded by sparsely populated areas. For example, the parent beam can be directed to cover Los Angeles, while the dependent beams can cover Northeastern California and Central Nevada, as shown in FIG. 17.

The parent beam 1702 provides coverage for the highly populated area while one or more dependent beams 1718 provide coverage for the sparsely populated areas. Each parent spot beam has a hub numbered 1704 centrally located within the footprint of the spot beam and a number of individual ground terminals 1706. For intra-beam communications between the ground terminals 1706 and the hub 1704 or between two ground terminals 1706, the ground terminals transmit an uplink signal 1714 having one type of polarization, such as left circular polarization to the GEO satellite 1708 equipped with a polarization-based router circuit. The router would then route the left circularly polarized signal as a downlink signal 1716 back to the parent spot beam.

For broadcast transmissions, the hub 1704 in the parent spot beam 1702 transmits two broadcast signals 1710, one right circularly polarized and one left circularly polarized, simultaneously to the GEO satellite. A polarization-based router in the GEO satellite separates the two signals and transmits the left circularly polarized signal 1716 back to the parent spot beam and the right circularly polarized signals 1722 down to the dependent spot beams.

Additionally, frequency routing may be added to the polarization routing to provide added flexibility in determining which programs are transmitted to which dependent beams. For example, a right circularly polarized frequency band used for broadcast data may be divided into n equal segments, where ii is the number of spot beams employed by the SATCOM system. Each segment directly corresponds to an individual dependent spot beam (i.e., the first segment corresponds to a first dependent spot beam, the second segment corresponds to a second dependent spot beam, etc.). Separate, independent broadcast signals could then be assigned to the separate segments to provide localized broadcast data to these areas covered by the dependent spot beams.

Figure 18:
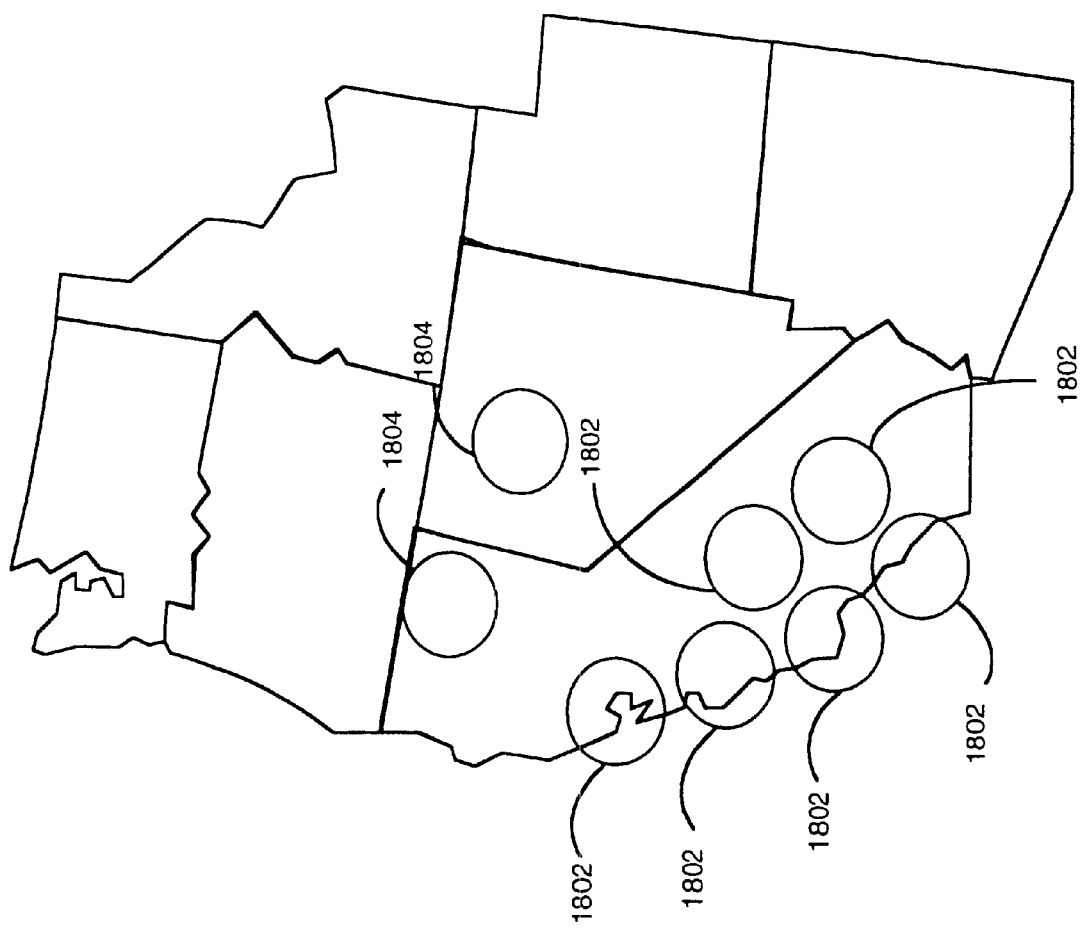
FIG. 18 is an illustration of an exemplary spot beam pattern network for a parent-dependent configuration for the Western United States.

FIG. 18 illustrates a spot beam distribution for a parent-dependent inter-beam service in accordance with an exemplary embodiment of the present invention. Parent spot beams 1802 may provide coverage to highly populated area such as the region stretching from San Francisco, Calif. to San Diego, Calif. In each of these parent spot beams, both local and broadcast services may be provided. However, in areas such as central Nevada, and northern California, where the population and demand for services is small, dependent spot beams 1804 may be used to receive broadcast services from the parent beams.

Figure 19:
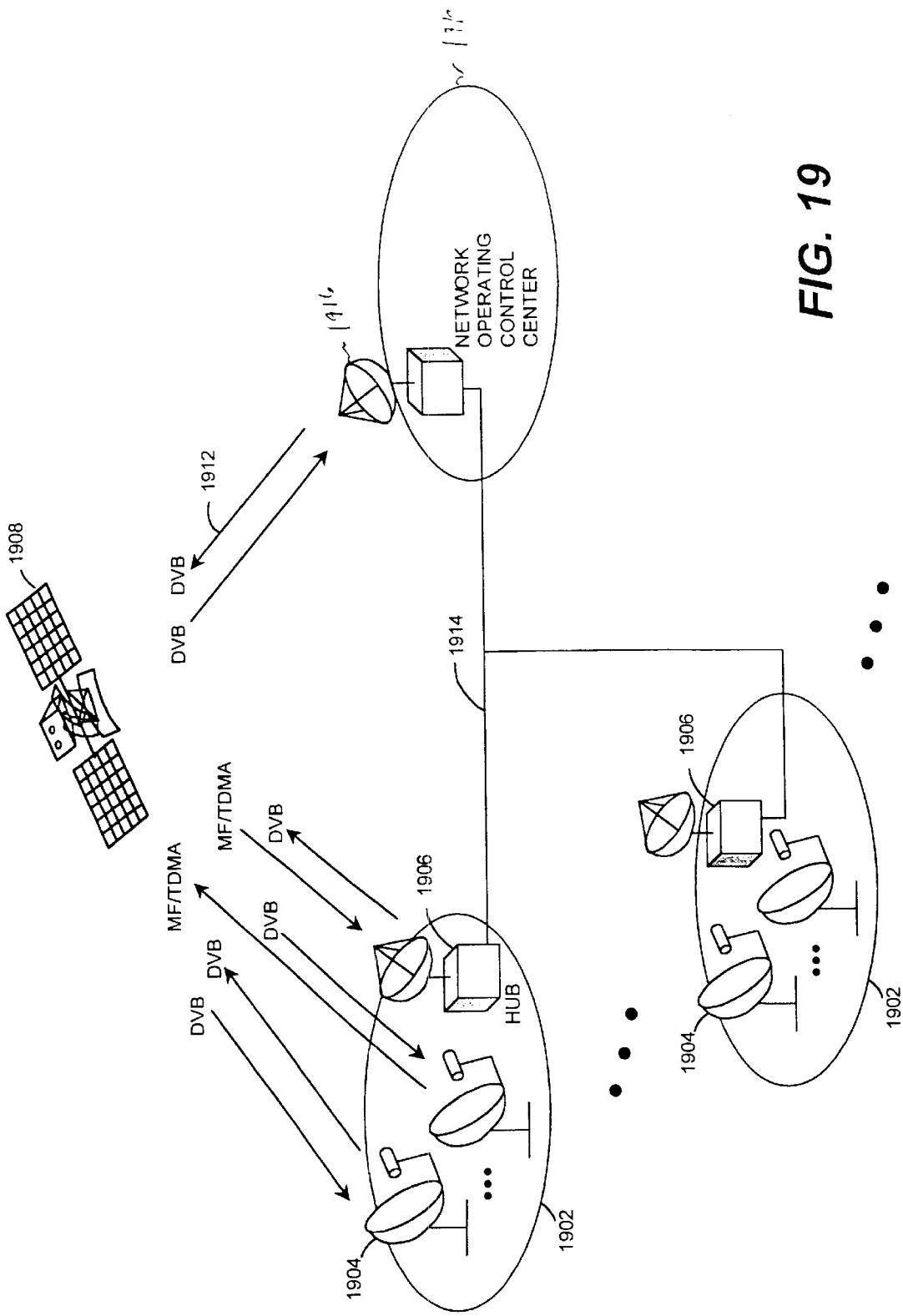
FIG. 19 is an illustration of an exemplary embodiment of the invention operating in a Network Operating Control Center (NOCC) SATCOM configuration.

FIG. 19 illustrates an alternative method for broadcast service routing. A Network Operating Control Center (NOCC) 1916 operates in a NOCC spot beam 1910, which is created in an area separated from all the other service spot beams numbered 1902 in accordance with an exemplary embodiment of the present invention. A portion of the uplink band is set aside for broadcast user return signals. These signals, once received by the input spot beam antennas and amplified, are combined in the frequency domain with a power combiner. The Network Operating Control Center 1916 coordinates uplink frequencies so that no two broadcast signals use the same frequency band. The combined signal is routed for broadcast by the satellite numbered 1908 to the ground terminals 1904 in the downlink spot beams 1902 via a retransmission 1912 from the Network Operating Control Center 1916. This service is a "double-hop" service because of the intermediate transmission to the network control center. Alternatively, the signals intended for broadcast from the Network Operations Control Center 1916 could be delivered through the WAN 1914 from a hub 1906 or user of the satellite network or directly from an outside source.

Figure 20:
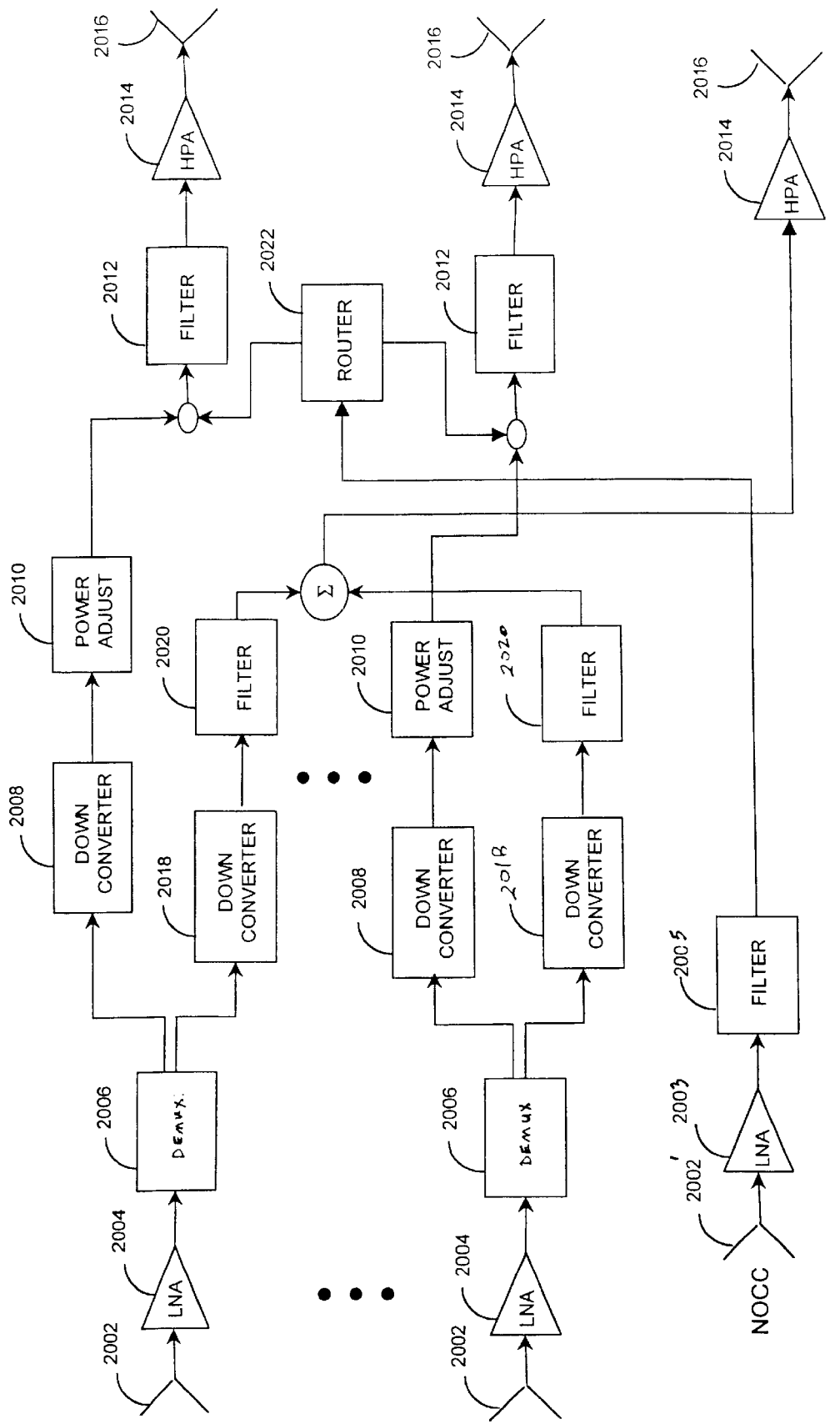
FIG. 20 is an illustration of a combination frequency-based router circuit used for the NOCC configuration in accordance with an exemplary embodiment of the present invention.

FIG. 20 illustrates the use of frequency-based routing to accommodate a NOCC within the network of spot beams in accordance with an exemplary embodiment of the present invention. The frequency-based router circuit comprises n identical circuits connected to a signal router 2022 or to a high power amplifier 2014, where n is the number of spot beams used by the SATCOM system. In contrast to the frequency-based router circuit shown in FIG. 12, a network operating control center provides an input to the router circuit.

A numbered uplink signal can enter the router circuit through one of the antennas numbered 2002 and is then amplified by a linear LNA 2004. The signal then passes through a demultiplexer 2006, or "demux," which separates the signal into two signals. The first signal passes through a down converter numbered 2008, which shifts the frequency to the numbered downlink frequency. In turn, this down-converted signal passes through a numbered power adjust circuit 2010, in which the output transmission power is set. The output of the power adjust circuit 2010 is passed to the filter 2012 to remove unwanted noise prior to increasing the amplitude of the signal at the amplifier numbered 2014. The output of the amplifier 2014 is transmitted by the antenna 2016.

The second signal output by the demultiplexer 2006 is passed to a down converter 2018, which shifts the frequency to the downlink frequency. In turn, the output of the down converter numbered 2018 is filtered by a filter 2020 to remove unwanted noise. This process can be completed numbered n times based upon the it number of spot beams employed by the SATCOM's system. Each output of filter 2020 is summed at a combiner and output to an amplifier 2014 for transmission via the antenna 2016.

The input signal provided by the Network Operating Control Center is received by the antenna 2002', amplified by the amplifier 2003, filtered by the filter 2005, and output to the router 2022. In turn, the router 2022 can output a redirected signal to the appropriate antenna 2016.

Figure 21:
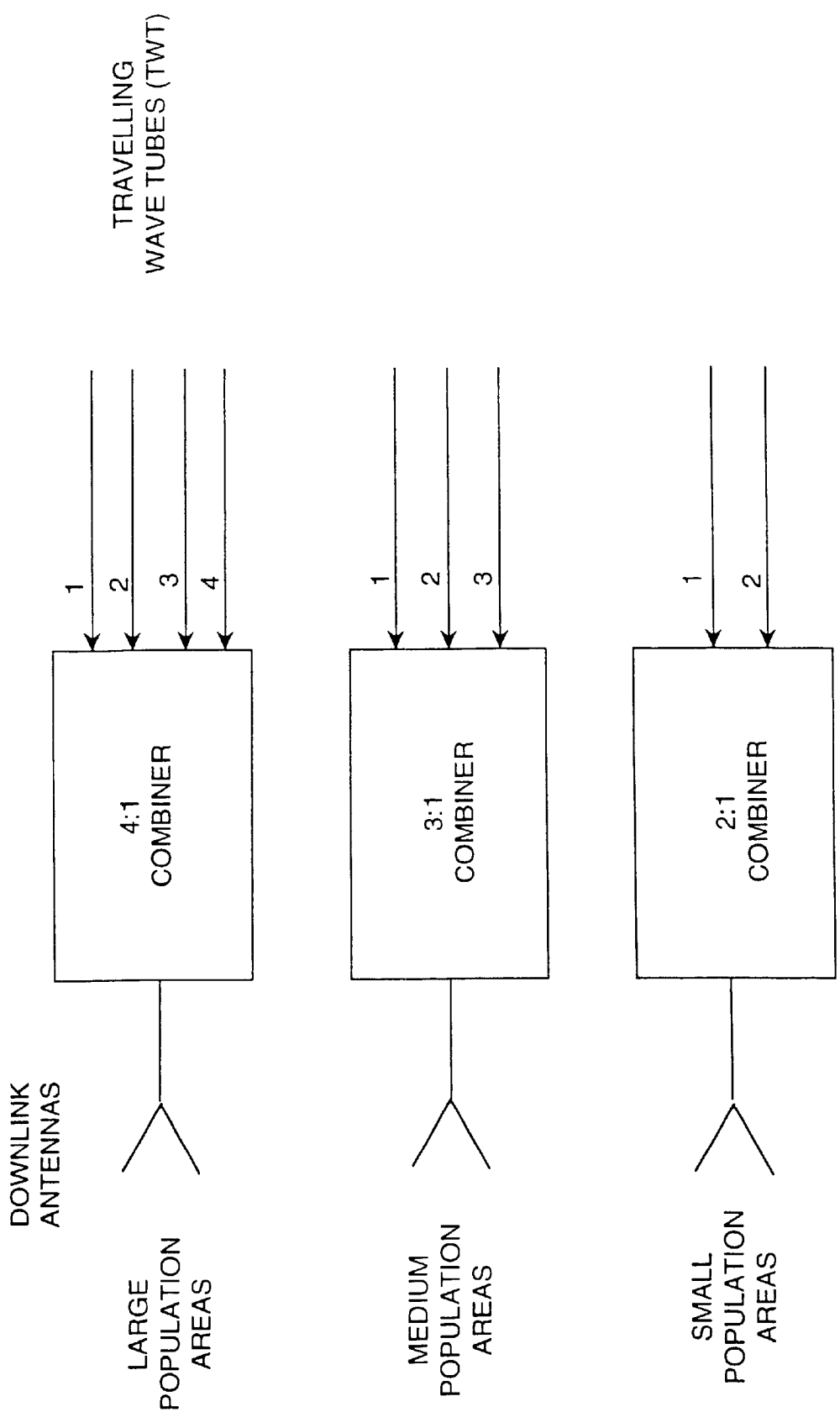
FIG. 21 is an illustration of a 4:1, 3:1, and 2:1 combiner circuits used for on-board satellite transmitter power control in accordance with an exemplary embodiment of the present invention.

FIG. 21 illustrates an exemplary system for controlling the satellite spot beam downlink transmitter power to adjust the channel capacity by combining circuits. The spot beam network concept allows some unique flexibilities on-board the satellite that a conventional DBS satellite does not have. A standard architecture Ku-band DBS satellite must provide full coverage of CONUS geography. Therefore, the DBS satellite must transmit its downlink power at a more or less constant level across the area. This is particularly wasteful when transmission of local channel DBS is only intended for a small area within CONUS. Additionally, spot beams over large population centers may require more capacity than less populated areas. Also, the peak periods of use will vary slightly from East Coast to West Coast during the day leading to variable power requirements. The variable power requirements may be accommodated by adopting a total power management control concept on the satellite in which downlink beams are excited by transmissions circuits, which combine 1, 2, or 4 high power sources. For example, consider a network of 100 spot beams in the CONUS geography. Each could transmit 15W on a continuous DVB downlink basis, totaling 1.5 KW of transmit power. Alternately, the top 10 population centers could be allocated 40W, the next 20 centers 20W, and the remaining 70 centers only 10W.

It should be, understood that the foregoing pertains only to exemplary embodiments of the present invention, and that numerous changes may be made to the embodiments described herein without departing from the spirit and scope of the invention.

What is claimed is:

1. A satellite communications system for distributing information to user terminals, said system comprising:

a satellite in a geosynchronous orbit;

a first terminal located in a first spot beam produced by the satellite;

a fist hub located within the first spot beam produced by the satellite;

a second terminal located in a second spot beam produced by the satellite, the first spot beam being spatially isolated from the second spot beam;

a second hub located within the second spot beam produced by the satellite; and a land-based communications network linking the first hub and second hub, said system comprising the first terminal communicating with the second terminal by transmitting the information along the first spot beam to the satellite, the satellite transmitting the information along the first beam to the first hub, the first hub routing the information over the land-based network to the second hub, the second hub transmitting the information along the second spot beam to the satellite, and the satellite transmitting the information along the second spot beam to the second terminal.

2. The system of claim 1, further comprising a third terminal located within the first beam, the first terminal and the third terminal being linked to the first hub, the first terminal communicating with the third terminal by transmitting the information along the first spot beam to the satellite, the satellite transmitting the information along the first beam to the first hub, the first hub transmitting the information along the first spot beam to the satellite, and the satellite transmitting the information along the first spot beam to the third terminal.

3. The system of claim 1, further comprising the first terminal transmitting the information along the first beam at a first frequency, and the satellite transmitting the information along the first beam at a second frequency.

4. The system of claim 1, further comprising the first terminal transmitting the information along the first beam at a first polarization, and the satellite transmitting the information along the first beam at a second polarization.

5. The system of claim 1, wherein the land-based communications network is further comprising a wide area network (WAN).

* * * * *

UNITED STATES PATENT AND TRADEMARK OFFICE
CERTIFICATE OF CORRECTION

PATENT NO. : 6,704,543 B1
DATED : March 9, 2004
INVENTOR(S) : Thomas E. Sharon et al.

It is certified that error appears in the above-identified patent and that said Letters Patent is hereby corrected as shown below:

Title page,
Item [75], Inventors, add the following:
-- Thomas W. Glynn, Annapolis, MD; Dennis L. Kershner, Ellicott City, MD. --

Signed and Sealed this

Thirteenth Day of July, 2004

JON W. DUDAS
*Acting Director of the United States Patent and Trademark Office*